United States Patent
Herman et al.

(10) Patent No.: US 12,030,063 B2
(45) Date of Patent: Jul. 9, 2024

(54) SEPARATION ASSEMBLY WITH A SINGLE-PIECE IMPULSE TURBINE

(71) Applicant: Cummins Filtration IP, Inc., Columbus, IN (US)

(72) Inventors: Peter K. Herman, Stoughton, WI (US); Chirag D. Parikh, Madison, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 1011 days.

(21) Appl. No.: 16/966,082

(22) PCT Filed: Feb. 1, 2019

(86) PCT No.: PCT/US2019/016406
§ 371 (c)(1),
(2) Date: Jul. 30, 2020

(87) PCT Pub. No.: WO2019/152879
PCT Pub. Date: Aug. 8, 2019

(65) Prior Publication Data
US 2021/0039115 A1  Feb. 11, 2021

Related U.S. Application Data

(60) Provisional application No. 62/625,624, filed on Feb. 2, 2018.

(51) Int. Cl.
*B04B 9/06*    (2006.01)
*B04B 1/08*    (2006.01)
*F03B 1/02*    (2006.01)

(52) U.S. Cl.
CPC ............ *B04B 9/06* (2013.01); *B04B 1/08* (2013.01); *F03B 1/02* (2013.01); *F05B 2220/30* (2013.01); *F05B 2240/241* (2013.01)

(58) Field of Classification Search
CPC ..... B04B 9/06; B04B 1/08; F03B 1/02; F05B 2220/30; F05B 2240/241; Y02E 10/20; F01D 1/026
See application file for complete search history.

(56) References Cited

U.S. PATENT DOCUMENTS 391,523 A   10/1888  Englebright
417,865 A   12/1889  Green
(Continued)

FOREIGN PATENT DOCUMENTS

CN    101012838    8/2007
CN    201025219    2/2008
(Continued)

OTHER PUBLICATIONS

First Office Action issued for Chinese Patent Application No. 201880006007.0, issued Feb. 26, 2021, 9 pages.
(Continued)

*Primary Examiner* — Walter D. Griffin
*Assistant Examiner* — Shuyi S. Liu
(74) *Attorney, Agent, or Firm* — Foley & Lardner LLP

(57) ABSTRACT

A separation assembly comprises a housing, a jet that expels a fluid within the housing, and a turbine positioned within the housing and positioned so as to be contacted by the fluid expelled from the jet. The fluid causes the turbine to rotate about a center rotational axis within the housing. The turbine comprises a first axial end, a second axial end, and a plurality of vanes extending axially relative to the center rotational axis from the first axial end to the second axial end. The plurality of vanes defines axially-extending channels between each of the plurality of vanes. The first axial end is axially open such that fluid can flow unblocked axially through the first axial end and into the channels. The jet is
(Continued)

positioned such that at least a portion of the fluid enters into the turbine through the first axial end.

19 Claims, 22 Drawing Sheets

(56) References Cited

U.S. PATENT DOCUMENTS

| | | | |
|---|---|---|---|
| 807,975 | A | 12/1905 | Stumpf |
| 1,681,705 | A | 8/1928 | Moody |
| 2,390,506 | A | 12/1945 | Buchi |
| 2,577,179 | A | 12/1951 | Buchi |
| 2,607,438 | A | 8/1952 | Bailey |
| 2,663,541 | A * | 12/1953 | Geen .................. F03B 1/00 |
| | | | 416/223 R |
| 3,041,039 | A * | 6/1962 | Ambroz ................ F03B 1/04 |
| | | | 415/43 |
| 3,286,984 | A | 11/1966 | Bachl |
| 3,802,046 | A | 4/1974 | Wachtell et al. |
| 4,057,370 | A | 11/1977 | Numata et al. |
| 4,065,233 | A | 12/1977 | Torigoe et al. |
| 4,279,624 | A | 7/1981 | Wilson |
| 4,382,746 | A | 5/1983 | Retz |
| 4,634,344 | A | 1/1987 | Zagar et al. |
| 4,669,952 | A | 6/1987 | Forsyth et al. |
| 5,263,814 | A | 11/1993 | Jang |
| 5,296,769 | A | 3/1994 | Havens et al. |
| 5,611,668 | A | 3/1997 | Yapp et al. |
| 6,017,300 | A | 1/2000 | Herman |
| 6,019,717 | A | 2/2000 | Herman |
| 6,071,300 | A | 6/2000 | Brenneman et al. |
| 6,213,929 | B1 * | 4/2001 | May .................... B04B 9/06 |
| | | | 494/24 |
| 6,508,628 | B2 | 1/2003 | Amr |
| 6,572,336 | B2 | 6/2003 | Horng et al. |
| 6,925,993 | B1 | 8/2005 | Eliasson et al. |
| 8,734,097 | B2 | 5/2014 | Kenyon et al. |
| 9,322,307 | B2 | 4/2016 | Andersson Aginger |
| 9,677,563 | B2 | 6/2017 | Kenyon et al. |
| 10,605,246 | B2 | 3/2020 | Kenyon et al. |
| 11,173,500 | B2 | 11/2021 | Scheckel et al. |
| 2002/0098083 | A1 | 7/2002 | Blangetti et al. |
| 2003/0185682 | A1 | 10/2003 | Lei et al. |
| 2004/0213675 | A1 | 10/2004 | Blangetti et al. |
| 2004/0219022 | A1 | 11/2004 | Yang |
| 2006/0003882 | A1 | 1/2006 | Smith |
| 2006/0039791 | A1 | 2/2006 | Kim |
| 2006/0093485 | A1 | 5/2006 | Horng et al. |
| 2009/0175729 | A1 | 7/2009 | Sun |
| 2009/0175729 | A1 | 7/2009 | Sun |
| 2011/0180051 | A1 | 7/2011 | Schwandt et al. |
| 2013/0032646 | A1 | 2/2013 | Dhiman et al. |
| 2013/0056407 | A1 | 3/2013 | Parikh et al. |
| 2013/0094939 | A1 | 4/2013 | Farb et al. |
| 2013/0327010 | A1 | 12/2013 | Muller et al. |
| 2014/0147631 | A1 | 5/2014 | Yang et al. |
| 2015/0003996 | A1 | 1/2015 | Krishna et al. |
| 2015/0037134 | A1 | 2/2015 | Isaev |
| 2015/0203687 | A1 | 7/2015 | Pardon et al. |
| 2015/0246477 | A1 | 9/2015 | Bormashenko et al. |
| 2016/0169226 | A1 | 6/2016 | Jenkins et al. |
| 2020/0061638 | A1 | 2/2020 | Herman et al. |
| 2020/0171420 | A1 | 6/2020 | Holm et al. |
| 2021/0039115 | A1 | 2/2021 | Herman et al. |
| 2021/0102522 | A1 | 4/2021 | Parikh |
| 2021/0121896 | A1 | 4/2021 | Scheckel et al. |
| 2021/0404433 | A1 | 12/2021 | Kloster et al. |
| 2021/0404434 | A1 | 12/2021 | Kloster et al. |

FOREIGN PATENT DOCUMENTS

| | | | |
|---|---|---|---|
| CN | 202545093 U | * 11/2012 | ............. Y02E 10/20 |
| CN | 103879084 | 6/2014 | |
| EP | 2 638 944 | 9/2013 | |
| GB | 468 557 | 7/1937 | |
| GB | 938 967 | 10/1963 | |
| GB | 2 058 941 | 4/1981 | |
| GB | 2 455 816 | 6/2009 | |
| WO | WO-2007/110059 | 10/2007 | |
| WO | WO-2009/050462 A2 | 4/2009 | |
| WO | WO-2016/200928 A1 | 12/2016 | |
| WO | WO-2018/106539 A1 | 6/2018 | |
| WO | WO-2019/152879 | 8/2019 | |
| WO | WO-2019/0204265 | 10/2019 | |

OTHER PUBLICATIONS

Notice of Allowance on U.S. Appl. No. 16/465,931 DTD Jun. 6, 2022.
Office Action issued for Chinese Patent Application No. CN 2019800167481, issued Sep. 23, 2021, 15 pages.
Office Action issued for U.S. Appl. No. 17/044,371, issued Sep. 16, 2021, 30 pages.
Shuming Xing, Melted Metal Die Forging, National Defense Industry Press, Sep. 2011, pp. 221-223.
International Search Report and Written Opinion for PCT Application No. PCT/US2018/012762, dated Mar. 26, 2018, pp. 1-7.
International Search Report and Written Opinion from PCT Application No. PCT/US2019/016406, pp. 1-9.
International Search Report and Written Opinion issued for PCT/US2017/064268, issued Feb. 12, 2018, 8 pages.
International Search Report and Written Opinion issued for PCT/US2019/027615, issued Jun. 25, 2019, 18 pages.
Non-Final Office Action issued for U.S. Appl. No. 16/474,742, issued Jul. 7, 2020.

* cited by examiner

Section A-A
Prior Art

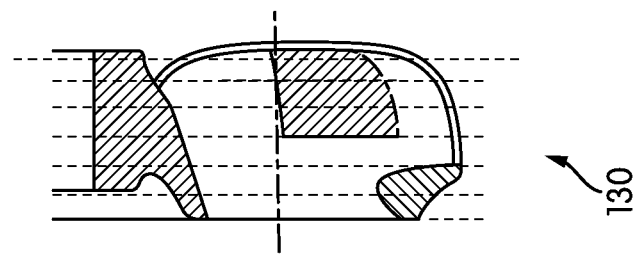
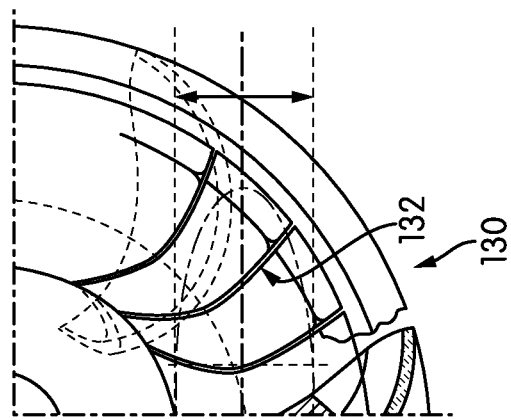
FIG. 9
Prior Art
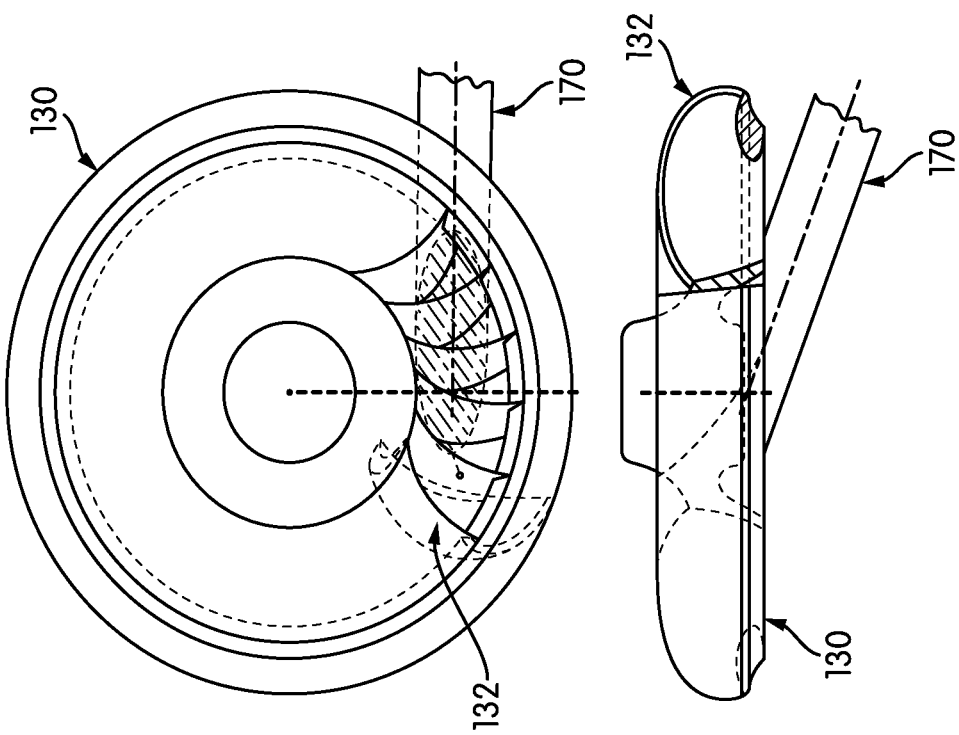
FIG. 8
Prior Art

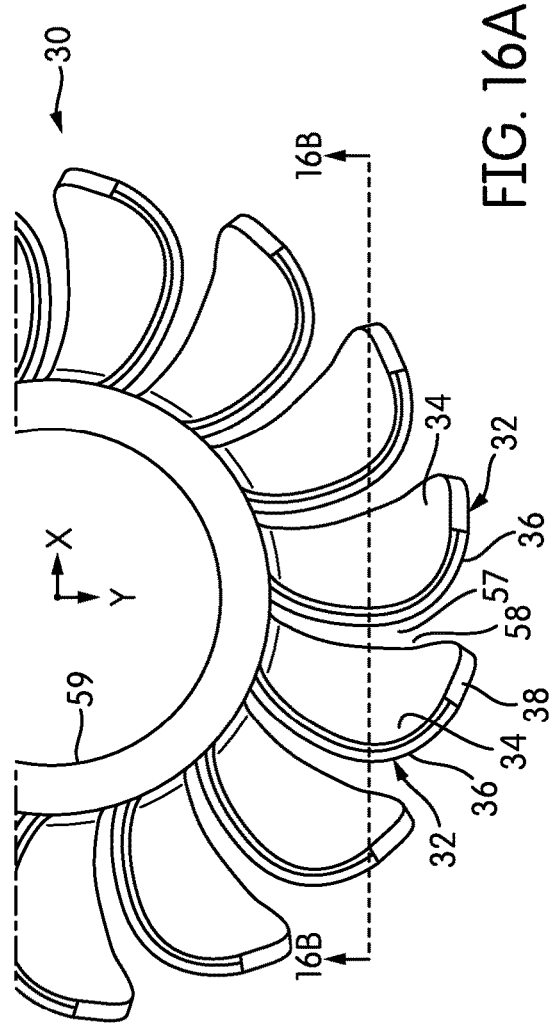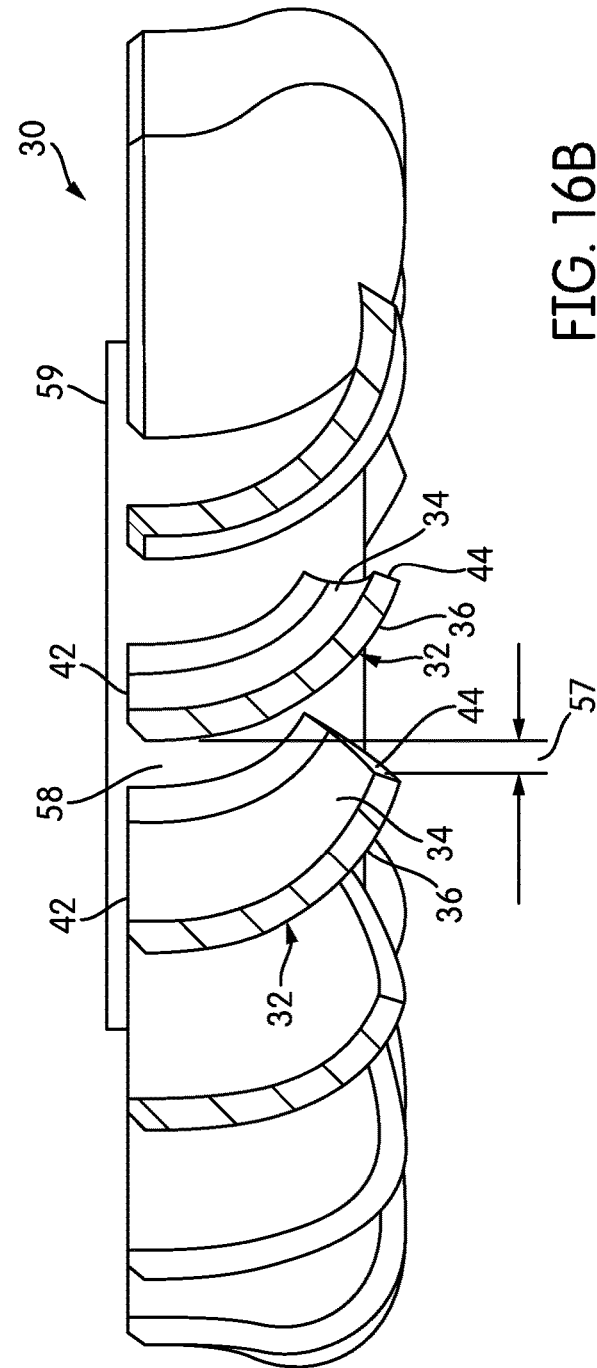

SEPARATION ASSEMBLY WITH A SINGLE-PIECE IMPULSE TURBINE

CROSS REFERENCE TO RELATED APPLICATIONS

This application is a National Stage of PCT Application No. PCT/US2019/016406, filed Feb. 1, 2019, which claims priority to and the benefit of U.S. Provisional Patent Application No. 62/625,624, filed Feb. 2, 2018. The contents of these applications are incorporated herein by reference in their entirety.

FIELD

The present invention relates generally to impulse turbines.

BACKGROUND

An impulse turbine assembly is a rotary system where the flow of fluid from a jet rotates a turbine, thereby converting hydraulic energy from the flow of fluid into rotational energy and converting hydraulic power (where hydraulic power is equal to the pressure times the flow) to mechanical power (where mechanical power is equal to the torque times the speed). Accordingly, impulse turbine assemblies can be used to power various devices, such as rotating filtration or separation devices. For example, impulse turbine assemblies can be used to power centrifuges (e.g., liquid-particle separators) or air-oil separators (e.g., crankcase ventilation devices). There are various types of impulse turbine assemblies such as Turgo-style or Pelton-style turbine assemblies (and various modifications for each style).

FIGS. 1A-10 show various examples of conventional impulse turbine assemblies 130 with impinging liquid jets 170. FIG. 1A is an example of a conventional turbine assembly 130 that has a Turgo-style with a nearly-tangential jet 170 (with slight axial-downward tilt-angle) that expels fluid 172 into the conventional turbine assembly 130 at a finite approach angle (typically approximately 15-20°) from above or below. FIG. 1B is a schematic representation of an assembly 121 that utilizes a conventional Turgo-style impulse turbine assembly 130. FIG. 2 is an example of another conventional turbine assembly 130 that has a Pelton-style with a "split-bucket" with a tangential jet 170 expelling fluid 172. FIG. 3 is an example of a conventional turbine assembly 130 that has a modified single-bucket Pelton-style turbine with a tangential jet 170 such that the fluid 172 enters through the top and is discharged through the bottom. FIG. 4 is another example a conventional turbine assembly 130 that has a modified "two-part" Pelton-style turbine in which the conventional turbine assembly 130 is split in the center or middle region along a substantially horizontal radial-tangential plane (that is perpendicular to the axial direction for assembly) between the top half and the bottom half of the conventional turbine assembly 130.

FIGS. 5-10 show other examples of conventional turbine assemblies 130. FIGS. 5 and 6 show an example of a two-part conventional turbine assembly 130 with a closed bottom and a modified single-vane Pelton style (in which a tangential jet is used, rather than a jet at an angle), as disclosed by U.S. Pat. No. 6,925,993 and FIG. 7 shows another example of a similar two-part conventional turbine assembly 130 as disclosed by EP2638944, the entire disclosures of which are incorporated herein by reference. Each of the conventional turbine assemblies 130 in FIGS. 5-7 only have approximately a 50% efficiency. FIGS. 8 and 9 show examples of conventional turbine assemblies 130 that are Turgo-style in which the jet 170 is directed or angled downwardly to the conventional turbine assembly 130, as disclosed by GB468557A and GB938967A, respectively, the contents of which are incorporated herein by reference. FIGS. 8 and 9 also show examples of a profile and shape of the vanes 132 of the conventional turbine assemblies 130.

Each of the above-mentioned conventional turbine assemblies 130 has a relatively complex vane curvature in which the top end 142 of each of the vanes 132 has an undercut feature (where the vanes 132 extend vertically between the top end 142 and the bottom end 144). This undercut feature allows the conventional turbine assembly 130 to be more efficient and "smooths" or otherwise improve the fluid flow. However, these undercut features cause the conventional turbine assembly 130 to have relatively complex geometry, which requires the conventional turbine assembly 130 to comprise multiple separate parts. The conventional turbine assembly 130 comprises at least two separate components or parts and, in some cases, 22 separate components to be assembled together in order to create or produce a conventional turbine assembly 130, which increases the complexity and cost of the conventional turbine assembly 130. For example, the conventional turbine assembly 130 may have a separate part for each bucket or blade, which may be assembled with a hub, which is normal practice for existing hydroelectric turbine runners of conventional turbine assemblies 130. Alternatively, as described above, the conventional two-part turbine assembly 130 in FIG. 4 is split down the middle between a top half and a bottom half that are attached to each other to create the conventional turbine assembly 130 (meaning that each of the vanes 132 is formed from two different components that are bonded or otherwise coupled to each other). Furthermore, with normal manufacturing methods and tolerances, it is particularly difficult to achieve a smooth surface-to-surface match on the blade pressure-face of each of the vanes 132. If a surface discontinuity exists along the blade pressure-face of the vanes 132, the laminar flow will be disrupted along the surface of the vanes 132, which reduces the hydraulic efficiency.

SUMMARY

Various embodiments provide for a separation assembly that comprises a housing, a jet that expels a fluid within the housing, and a turbine positioned within the housing and positioned so as to be contacted by the fluid expelled from the jet. The fluid causes the turbine to rotate about a center rotational axis within the housing. The turbine comprises a first axial end, a second axial end, and a plurality of vanes extending axially relative to the center rotational axis from the first axial end to the second axial end. The plurality of vanes defines axially-extending channels between each of the plurality of vanes. The first axial end is axially open such that fluid can flow unblocked axially through the first axial end and into the channels. The jet is positioned such that at least a portion of the fluid enters into the turbine through the first axial end.

Various other embodiments provide for a turbine for use in a separation assembly, the turbine sized for positioning within housing of the separation assembly and positionable so as to be contacted by fluid expelled from a jet of the separation assembly, thereby causing the turbine to rotate about a center rotational axis within the housing. The turbine comprises a first axial end, a second axial end, and a plurality of vanes extending axially relative to the center rotational axis from the first axial end to the second axial end. The plurality of vanes define axially-extending channels between each of the plurality of vanes. The first axial end is axially open such that fluid can flow unblocked axially through the first axial end and into the axially-extending channels.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 8 is top and cross-sectional side views of a conventional turbine assembly.

FIG. 9 is top and cross-sectional side views of a conventional turbine assembly.

FIG. 16A is a top view of the turbine of FIG. 12A.

FIG. 16B is a cross-sectional view through Section 16B-16B of FIG. 16A.

DETAILED DESCRIPTION

Referring to the figures generally, various embodiments disclosed herein relate to a separation assembly with a turbine that is hydraulically driven. Due to various modifications compared to conventional turbines, the turbine is constructed as a single-piece and with a Turgo-style and still retains a relatively high (i.e., greater than 60%) hydraulic efficiency. The turbine can be driven at a high rotational speed via a pressurized jet with, for example, lube oil. Although the efficiency is slightly compromised (compared to conventional turbines with many separate parts), the present turbine is inexpensive compared to conventional turbine assemblies due to the configuration of the turbine (as described further herein).

Separation Assembly

Figure 10:
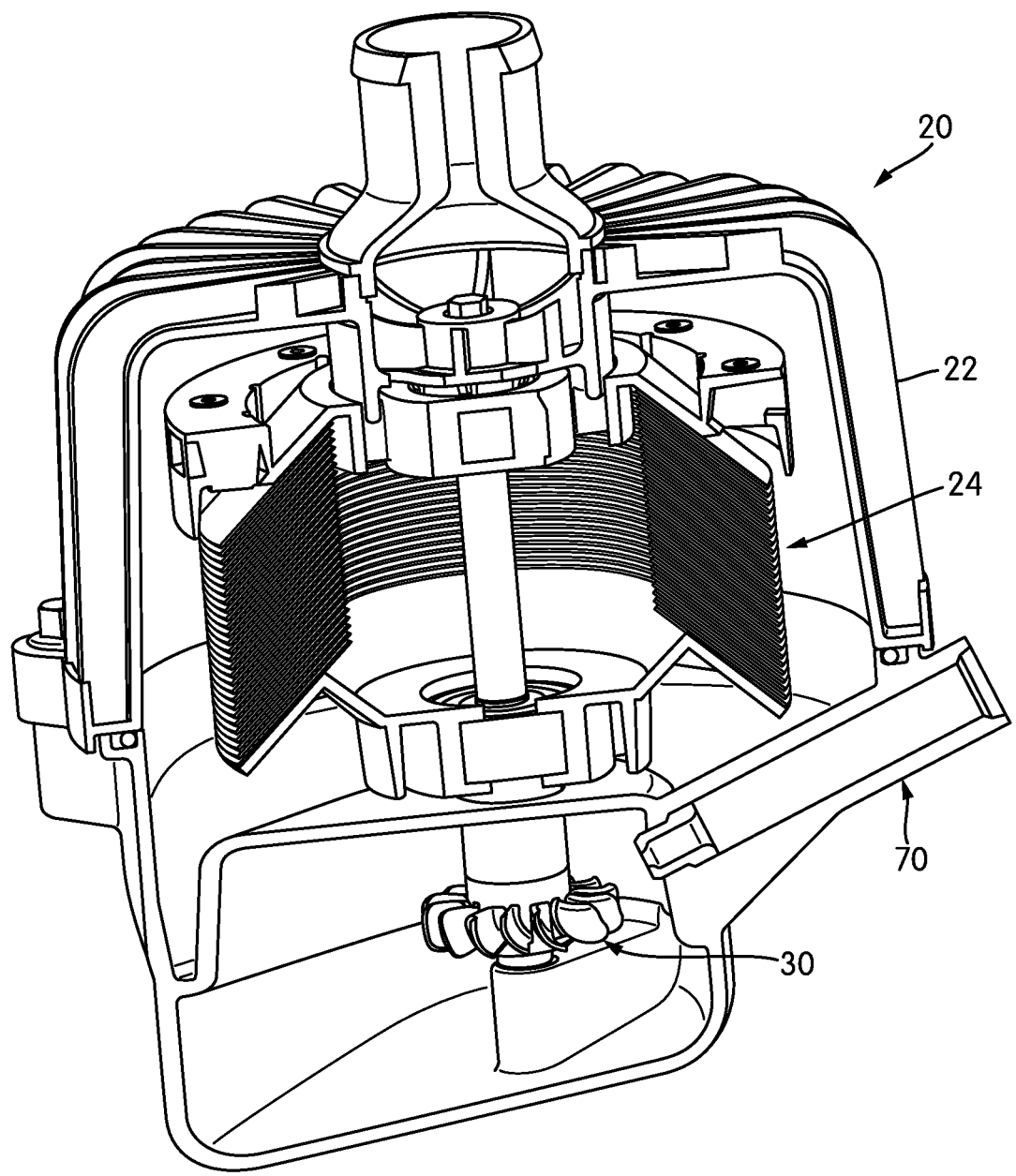
FIG. 10 is a cross-sectional view of a separation assembly according to one embodiment.
Figure 11:
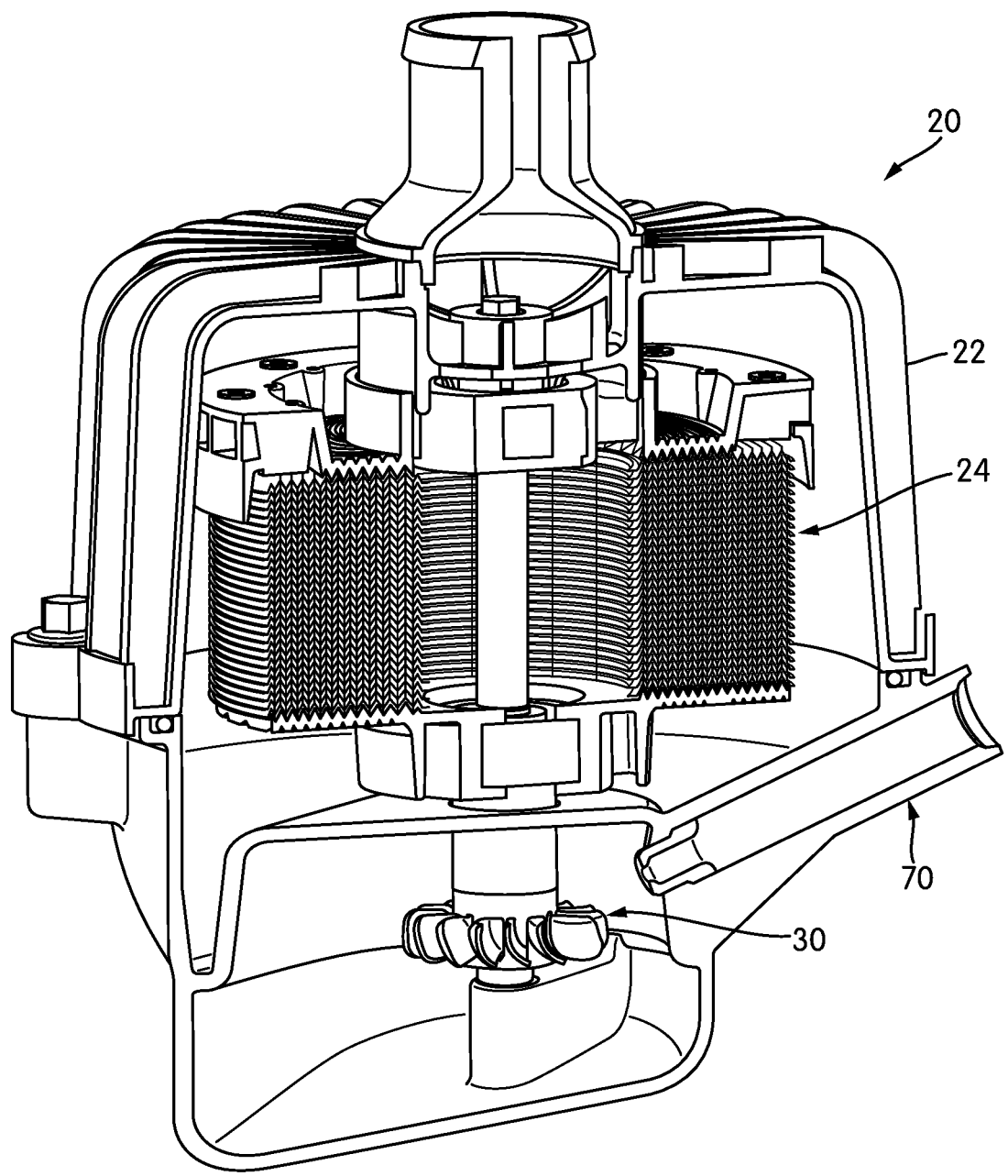
FIG. 11 is a cross-sectional view of a separation assembly according to another embodiment.

As shown in FIGS. 10-11, the separation device or assembly 20 comprises a housing 22, an impulse turbine 30, and a rotor portion 24 that the turbine 30 is configured to rotate. The turbine 30 and the rotor portion 24 are positioned and rotatable within the housing 22. The separation assembly 20 further comprises a tangential nozzle or jet 70 that is configured to expel fluid 72 within the housing 22 toward and into the turbine 30 in order to rotate the turbine 30 within the housing 22 and allow the turbine 30 to power the rest of the separation assembly 20.

The separation assembly 20 may utilize a variety of different separation technologies, including but not limited to plates, channels, and various cylindrical filter media. For example, according to one embodiment as shown in FIG. 10, the separation assembly 20 is a cone or disc stack separator. According to another embodiment as shown in FIG. 11, the separation assembly 20 is an involute plate/channel stack separator.

The separation assembly 20 may be a variety of different rotating filtration or separation devices, including but not limited to a lube-oil-driven product, a centrifuge (such as a rotating aerosol or particle separation device, a liquid-particle separator, an aerosol separator, a liquid centrifuge (with a lube bypass), etc.), an inertial separator, a lube-oil separator, and an air-oil separator (such as a rotating crankcase ventilation air-oil separator (that is, for example, media-based, axial-channel based, involute based, etc.), a crankcase blowby oil separator, or a rotating crankcase air-oil separator). The separation assembly 20 may be used as a lube-oil centrifuge as described, for example and according to one embodiment, in U.S. Pat. No. 6,071,300, the entire disclosure of which is incorporated herein by reference. The separation assembly 20 may be used for air filtration and/or for emissions and may be hydraulically driven. Further, the separation assembly 20 may be mounted to or used within an engine.

The rotor portion 24 can comprise a variety of different rotatable portions within the separation assembly 20 and may comprise, for example, cone stack, spiral vane, or media type filter element in order to filter a fluid and a rod to rotatably connect the turbine 30 to the filter element. The rotor portion 24 is configured to be inexpensively rotated or driven by the turbine 30.

Jet

As shown in FIGS. 10-11, the pressurized and impinging or impulse fluid drive jet 70 is positioned near the turbine 30 in order to direct fluid 72 to the turbine 30. The jet 70 may be integrated within a portion of the housing 22. The pressurized jet 70 expels a pressurized fluid 72 (e.g., a drive liquid) from an end or nozzle of the jet 70 (at a smaller diameter than the body of the jet 70) toward the turbine 30 to spin, rotate, or otherwise turn the turbine 30. The pressure or flow of the fluid 72 causes the turbine 30 to rotate, thus transferring the kinetic energy (as created by conversion from pressure, per Bernoulli) of the flowing fluid 72 to the turbine 30, which rotates the turbine 30.

Since the turbine 30 is a Turgo-style turbine, the jet 70 is positioned above the turbine 30 and angled downward (relative to a horizontal radial-tangential plane of the turbine 30) toward the turbine 30 with the end of the nozzle pointing and directly fluid 72 toward the top end 42 of the vanes 32 of the turbine 30. The particular angle of the jet 70 to the turbine 30 is described further herein.

The fluid 72 may be, for example, a liquid. According to a more particular embodiment, the fluid 72 may be typical drive fluid such as oil (e.g., engine oil, lube oil, or hydraulic fluid). For example, the fluid 72 may be pressurized engine lube oil. As described further herein, the fluid 72 has a relatively high working-temperature viscosity compared to water.

Turbine

As shown in FIGS. 12A-13, 15A-16B, 18A-18B, 20B-21, and 26-31, the single-piece, hydraulic, impulse wheel or turbine 30 is a rotatable component within the separation assembly 20 (as shown in FIGS. 10-11) that is driven by the fluid 72 in order to rotate the rotor portion 24 within the separation assembly 20. More specifically, the turbine 30 is positioned within the housing 22 so as to be contacted, rotated, or hydraulically driven in a rotational direction by the fluid 72 expelled from the jet 70. The turbine 30 thus rotates or drives the rotor portion 24 such that rotation of the rotor portion 24 is correlated to rotation of the turbine 30. The force of the incoming fluid 72 from the jet 70 causes the turbine 30 to rotate about the center rotational axis 64 within the housing 22 of the separation assembly 20, thereby converting the hydraulic power of the fluid 72 into mechanical power.

The turbine 30 is used to convert hydraulic power into mechanical power, where hydraulic power=pressure*flow and mechanical power=torque*speed. Accordingly, the turbine 30 receives a flow of fluid 72 from the jet 70 at a high velocity. The fluid momentum flux of the fluid 72 is transferred to the turbine 30 as an impulse force, which then rotates the turbine 30 with some associated losses (e.g., losses associated with the conversion of power from hydraulic to rotational). Accordingly, the turbine 30 imparts a "change in momentum" or "impulse" on the fluid, thereby converting the momentum of the fluid 72 into a force or torque, which rotates the turbine 30 and thus rotates the rotor portion 24. Although a variety of different rotational speeds are possible, the rotational speed is 5,000 to 10,000 revolutions per minute (rpm) in particular embodiments.

The turbine 30 is formed as a single-piece of material and can therefore be molded or cast by inexpensive manufacturing processes. Since the turbine 30 is made from a single-piece of material, the turbine 30 does not require any assembly of different components or parts. Accordingly, the turbine 30 can be inexpensively manufactured in order to inexpensively drive and power the separation assembly 20 at a relatively high rotational speed. Furthermore, since the turbine 30 is a single, unitary component within the separation assembly 20, the turbine 30 is not created or assembled out of distinct components and cannot be separated into further distinct components without damage or destruction occurring to the turbine 30.

Turbine Configuration

The turbine 30 has an impulse-bucket design that is Turgo-style. Turgo-style is characterized by the jet 70 being angled downward toward and onto the top entrance-face (i.e., the first axial end 52) of the turbine 30. With a turbine 30 that is Turgo-style, the jet 70 is at an angle relative to a horizontal radial-tangential plane of the turbine 30 (where the horizontal radial-tangential plane is perpendicular to the axial center rotational axis 64 of the turbine 30). Comparatively, in a turbine that is Pelton-style in various prior art designs, the jet is a straight tangential jet and is substantially parallel to the horizontal radial-tangential plane of the turbine.

Figure 12A:
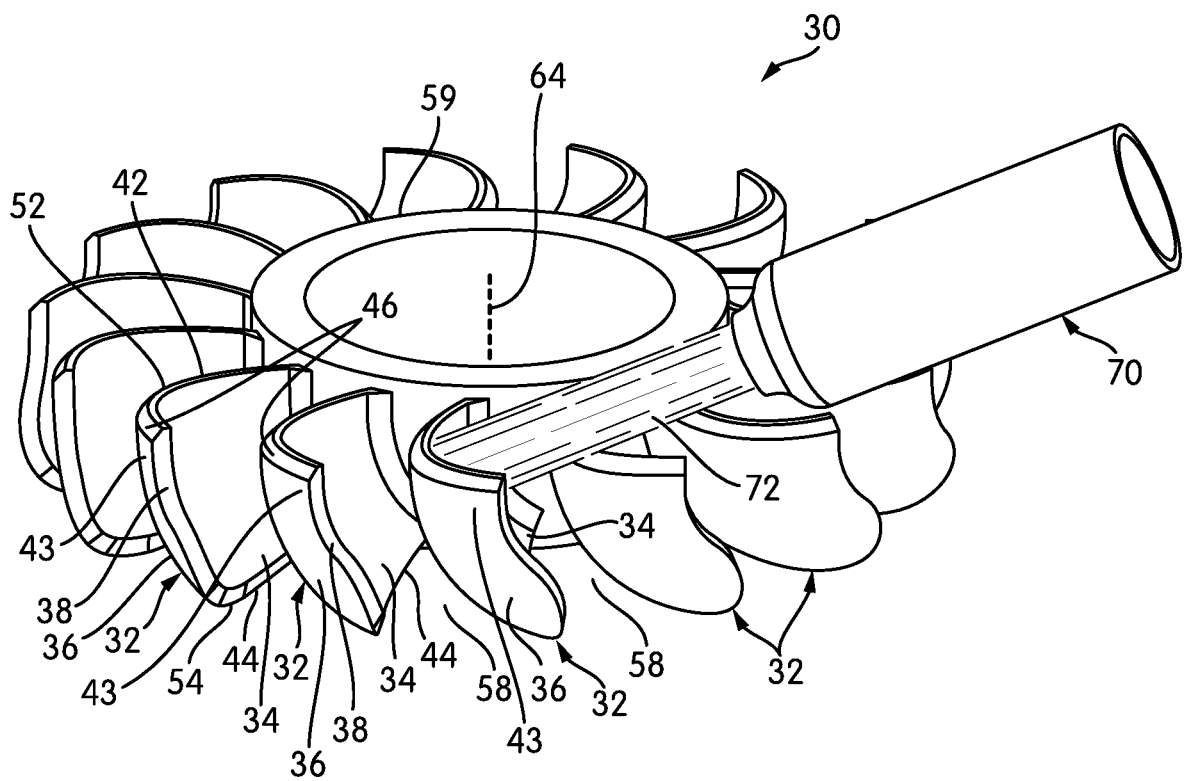
FIG. 12A is a perspective view of a turbine according to one embodiment that can be used within the separation assembly of FIG. 10.

As shown in FIG. 12A, the turbine 30 comprises a first axial end 52, a second axial end 54, and a plurality of vanes 32 extending axially relative to the center rotational axis 64 from the first axial end 52 to the second axial end 54. The first axial end 52 and the second axial end 54 of the turbine 30 are opposite each other along the length of the center rotational axis 64. The turbine 30 and the jet 70 are oriented relative to each other such that the jet 70 directs at least a portion of the fluid 72 to enter into the turbine 30 through the first axial end 52. Neither the first axial end 52 nor the second axial end 54 are axially closed off (as shown in FIGS. 16A-16B) such that fluid can flow axially between and through the first axial end 52 and the second axial end 54 through the entire axial length of turbine 30 (in particularly the vanes 32).

As shown in FIG. 12A, the overall shape of the turbine 30 is substantially cylindrical. The turbine 30 has an axial center rotational axis 64 extending through the center and along the axial length of the turbine 30. The center rotational axis 64 extends in the axial direction (i.e., the center rotational axis 64 and the axial direction are parallel to each other) and the turbine 30 rotates about the center rotational axis 64. The turbine 30 may optionally define a center hub 59 extending along at least a portion of the length of the turbine 30 and around the center of the turbine 30 (i.e., substantially parallel to and surrounding the center rotational axis 64). At least a portion of the hub 59 may be hollow to provide an area within the turbine 30 to attach with a feature within the separation assembly 20 that connects the turbine 30 to the rotor portion 24 to allow the turbine 30 to cause the rotor portion 24 to rotate. The vanes 32 extend from an outer surface of the hub 59.

As described further herein, in order to allow the turbine 30 to be constructed or formed as a single-piece, be inexpensive, and still retain a reasonably high efficiency, the turbine 30 does not include certain features that would otherwise necessitate a multi-part turbine assembly (such as a two-part conventional turbine assembly 130 with the split through the middle or a conventional turbine assembly 130 with dozens of parts (i.e., a separate part for each bucket and blade), as shown in FIGS. 1-9). Instead, the turbine 30 includes other features to create such an effect (i.e., single piece, inexpensive, and with a reasonably high efficiency). For example, as described in more detail below, the turbine 30 does not include any undercut features along the first axial end 52 of the turbine 30, the number of vanes 32 is reduced (compared to conventional turbine assemblies 130), the angle of the jet 70 relative to a horizontal radial-tangential plane of the turbine 30 is increased (compared to conventional turbine assemblies 130), and the turbine 30 comprises a chamfer 46 between the top end 42 and the backside 36 of each of the vanes 32.

Figure 12B:
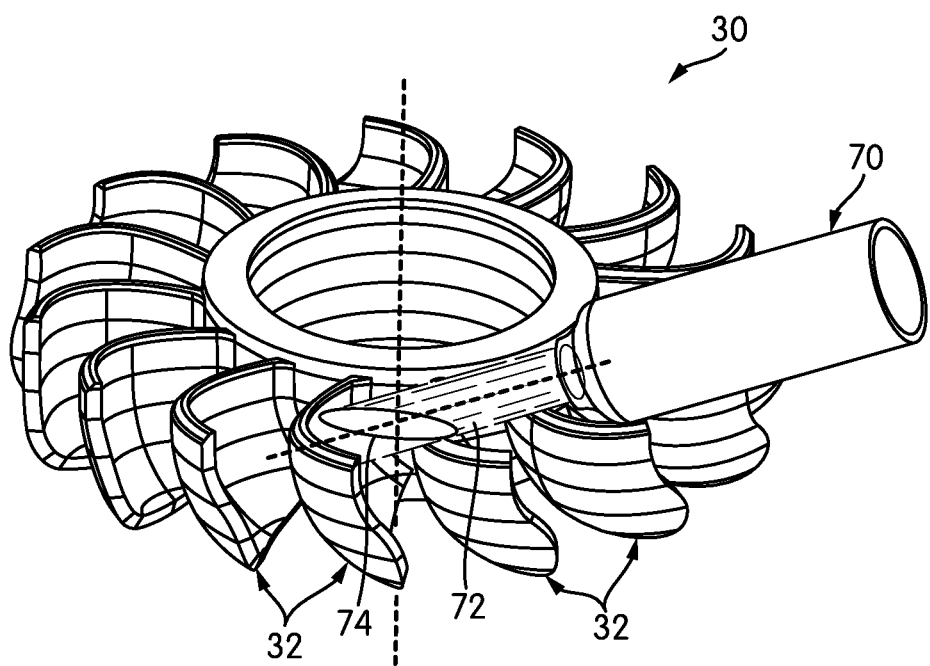
FIG. 12B is a perspective view of the turbine of FIG. 12A with various planes shown.

FIG. 12B shows various slicing planes (both axial and diametral planes) extending through the turbine 30. An elliptical jet interception patch 74 at the top end 42 of the vanes 32 is the area in which each vane 32 intercepts the fluid 72 from the jet 70 as the vane 32 passes underneath the flow of fluid 72.

Vanes

The turbine 30 also comprises multiple or a plurality of buckets, blades, or vanes 32 (referred to generally herein as "vanes") that are positioned and shaped to capture the flow of fluid 72 from the jet 70. Accordingly, the jet 70 directs the fluid 72 toward the vanes 32 in order to rotate the entire turbine 30.

Figure 13:
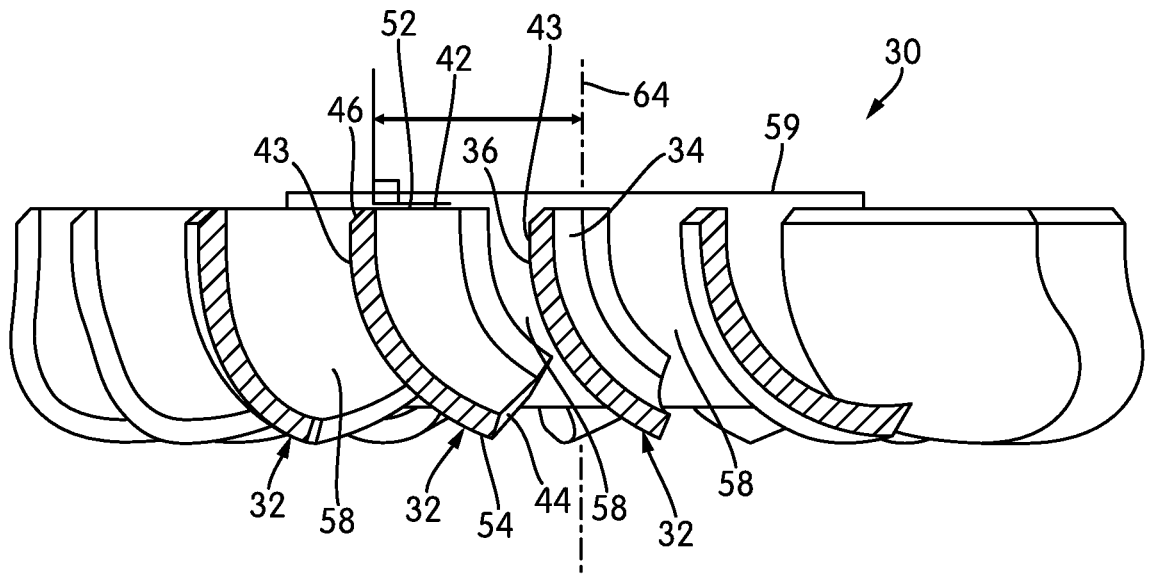
FIG. 13 is a cross-sectional view of the turbine of FIG. 12A.

Each of the vanes 32 comprises and extends vertically (i.e., axially) between a top end 42 and a bottom end 44. As shown in FIGS. 12A-13, each of the vanes 32 extend axially (e.g., along the direction of the center rotational axis 64) from the first axial end 52 of the turbine 30 to the second axial end 54 of the turbine 30. The vertical or axial leading edge or top end 42 of the vane 32 refers to the end of the vane 32 closest to the first axial end 52 of the turbine 30 and is the edge of the vane 32 that first intercepts the fluid 72 from the jet 70. The bottom end 44 of the vane 32 refers to the end of the vane 32 closest to the second axial end 54 of the turbine 30 and is opposite to the top end 42. A portion of each respective vane 32 bows or curves relative to the axial direction (that is parallel to the center rotational axis 64) between the top end 42 and the bottom end 44 of the vane 32 (in particular along a portion near the bottom end 44 of the vane 32). Accordingly, at the same radial distance from the center rotational axis 64, the top end 42 is further forward in the circumferential rotational direction about the center rotational axis 64 than the bottom end 44 of the vane 32 (as shown in FIGS. 12A and 16A).

Each of the vanes 32 also extends radially relative to the center rotational axis 64 from outside surface of the hub 59 of the turbine 30 and curves relative to the radial direction between an inner radial edge (that is closer to the center rotational axis 64) and an outer radial edge 38 (that is further from the center rotational axis 64) of the vane 32 such that the vane 32 curves about a portion of the circumference (e.g., about the center rotational axis 64) of the turbine 30. The vanes 32 are positioned and spaced out along the entire circumference of the turbine 30.

As shown in FIGS. 12A, 13, and 16A-16B, the vanes 32 define axially-extending, longitudinal, u-shaped gaps, spaces, or channels 58 between each of the vanes 32 in order to allow the fluid 72 to flow through the channels 58 between the vanes 32 and to direct the fluid 72 axially along the turbine 30. The channels 58 extend axially from the first axial end 52 to the second axial end 54 of the turbine 30.

The vanes 32 each comprise a pressure face or curved impingement side or surface 34 on a first side of the vane 32 and a back-swept surface, back-face, suction face, back surface, or backside 36 on a second side of the vane 32. The fluid 72 from the jet 70 is directed directly to the impingement surface 34 in order to rotate the turbine in the rotational direction. The impingement surface 34 is further upstream along the jet 70 than the backside 36 (i.e., the backside 36 is further forward along the rotational direction of the turbine 30 than the impingement surface 34). The impingement surface 34 curves inwardly axially and radially along a portion of the length of the vane 32 (i.e., inwardly along a lower-middle portion of the length of the vane 32), while the backside 36 curves outwardly axially and radially along a similar curvature along a portion of the length of the vane 32 (i.e., outwardly along a lower-middle portion of the length of the vane 32). The impingement surface 34 and the backside 36 of each of the vanes 32 connect to (and curve into) the outer surface of the hub 59 of the turbine 30 at the inner radial edges of each of the vanes 32.

The impingement surface 34 and the backside 36 converge at a side or outer radial edge 38 of the vane 32. The outer radial edge 38 of the vane 32 extends axially between the first axial end 52 and the second axial end 54 of the turbine 30 (and from the top end 42 to the bottom end 44 of the vane 32).

First Axial End of the Turbine

In order to be constructed inexpensively as a single piece, the first axial end 52 of the turbine 30 does not comprise a "reverse draft" or any undercut geometry features (including any top plate) and the turbine 30 has an "open top" or "open end" geometry, as shown in FIG. 13, which allows the turbine 30 to be straight-pull moldable or cast.

The undercut geometry feature is any portion, surface, or structure that prevents, blocks, or impedes at least a portion of the fluid 72 from axially entering into the turbine 30 through the first axial end 52 of the turbine 30 in the axial direction and flowing through the channels 58 along the top end 42 of each of the vanes 32. (It is noted that, while the undercut geometry feature blocks flow in the axial direction, the undercut geometry feature may still allow fluid 72 to flow into the channels 58 as a result of fluid 72 flowing in the tangential direction or fluid 72 flowing between undercut geometry features.) The turbine 30 does not comprise any structures that axially block or impede the axial flow of fluid 72 through the first axial end 52 along the axial direction. The undercut geometry feature includes any portion, surface, or feature that diverges from an "axial-parallel" direction and extends radially and/or tangentially from, for example, the impingement surface 34 and/or the backside 36 of the vanes 32 (in particular from the top end 42 of the vanes 32), from the outer surface of the hub 59 of the turbine 30 between the vanes 32 (in particular a top area of the hub 59), or from the top of the turbine 30 (e.g., along the first axial end 52). The undercut geometry feature may comprise, for example only, a lip, protrusion, extension, wall, or flange. Accordingly, the undercut geometry features block axial fluid flow through the first axial end 52 of the turbine 30. As such, the first axial end 52 of the turbine 30 is "axially open" in that fluid can flow unblocked axially through the first axial end 52 and into the channels 58 between the vanes 32 from the first axial end 52 of the turbine 30. The jet 70 and the turbine 30 are positioned such that at least a portion of the fluid 72 enters into the turbine 30 through the first axial end 52. With the various features of the present turbine 30, this configuration of the turbine 30 still allows the turbine 30 to have good hydraulic efficiency, converting the momentum of the fluid 72 into rotational torque on the turbine 30. Any decrease in performance is compensated for by increasing the angle of the jet 70, as described further herein.

Accordingly, as shown in FIG. 13, each of the vanes 32 comprises an axial or vertical top portion 43. The vertical top portion 43 of each of the vanes 32 (e.g., the area closest to and including the top end 42 of the vanes 32) is completely vertical and extends linearly (i.e., in a substantially straight line) in the axial direction, parallel to the center rotational axis 64 (and thereby substantially perpendicular to a top horizontal radial-tangential plane along the first axial end 52 of the turbine 30), to eliminate any undercut. The vertical top portion 43 may be, for example, approximately the top half or quarter of the vane 32. The first axial end 52 of the turbine 30 does not include any undercut features, such as curves or outward tangential extensions (that would axially block the fluid from flowing axially into the first axial end 52 of the turbine 30), which enables single-part molding or straight-pull tooling. Otherwise, undercut features may at least partially trap (from extraction) the tool used to form the surface of the vane. It is noted that, while the top portion 43 of the vanes 32 is substantially vertical and does not include any undercut features, the bottom portion of each of the vanes 32 may include an undercut feature (i.e., a feature along the bottom portion of the vanes 32 that diverges from the "axial-parallel" direction), while the vane 32 is still a single part.

Because the first axial end 52 of the turbine 30 does not have any undercut features, the portion of the impingement surface 34 at the top end 42 each of the vanes 32 is further forward than the rest of the impingement surface 34 (i.e., the furthest forward of the entirety of the impingement surface 34) in the rotational direction of the turbine 30.

Figure 14:
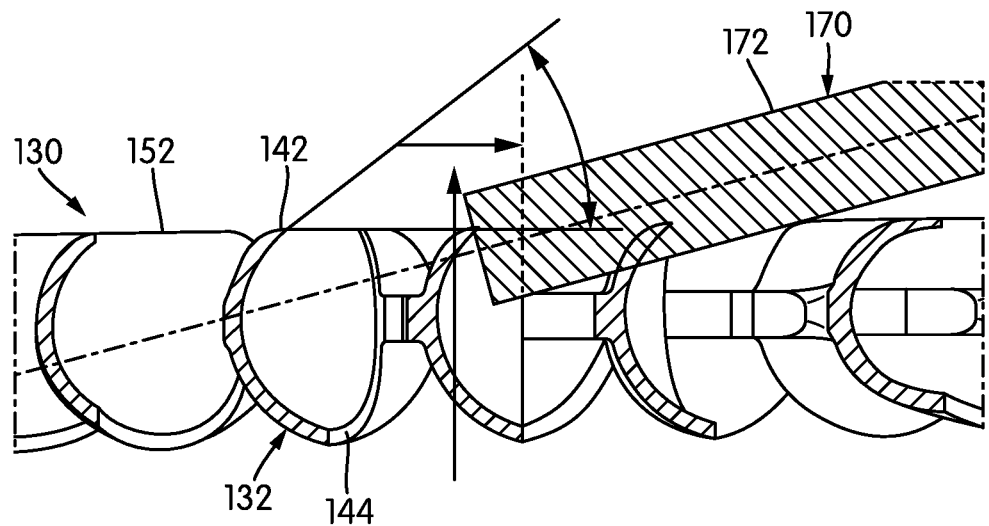
FIG. 14 is a cross-sectional view of the conventional turbine assembly of FIG. 1.

Comparatively, as shown with the turbine assembly 130 of FIG. 14, the top portion of each of the vanes 132 of conventional turbine assemblies 130 (that is closest to the top end 142 of the vane 132 compared to the bottom end 144 of the vane 132) is curved relative to any rotational axis, which creates an undercut feature along the first axial end 152 of the conventional turbine assembly 130. More specifically, the top end 142 of each of the vanes 132 is angled forward and tilted toward the jet 170 to better capture and contain the fluid 172 from the jet 170 into each of the vanes 132. The top portion of each of the vanes 132 is not parallel to any rotational axis and is less than 90° relatively to a horizontal radial-tangential plane, which creates an undercut feature along the first axial end 152 of the conventional turbine assembly 130. The impingement surface at the top end 142 of the vanes 132 is not further forward than the rest of the impingement surface. In particular, the middle of the impingement surface of the vanes 132 is the furthest forward of the entire impingement surface. Accordingly, in order to create the conventional turbine assembly 130, the vanes 132 must either be split with a parting line along the center of each of the vanes 132 or separate components must be molded individually and assembled to a carrier hub due to this undercut feature along the top portion of each of the vanes 132. It is noted that the bottom portion of each of the vanes 132 also includes a similar undercut feature.

Figure 15A:
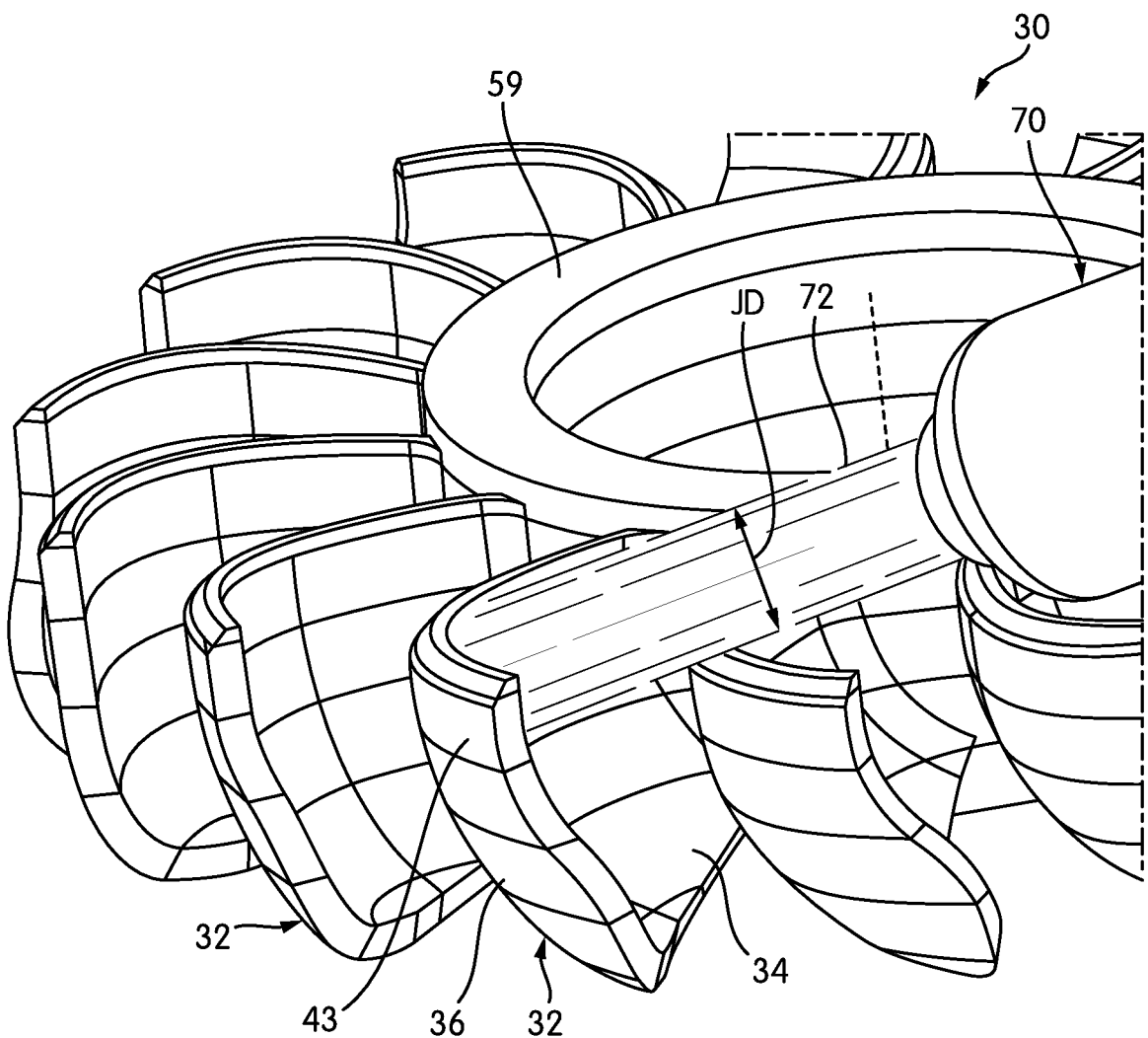
FIG. 15A is a perspective view of the turbine of FIG. 12A.
Figure 15C:
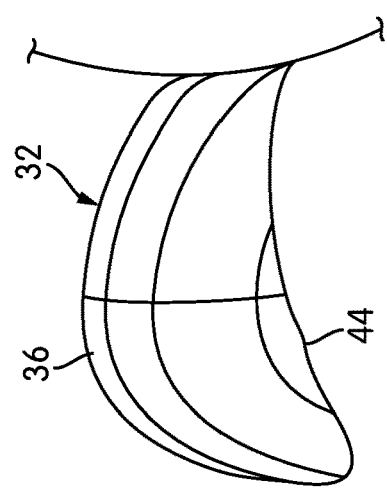
FIG. 15C is a bottom view of one of the vanes of the turbine of FIG. 15A.
Figure 15B:
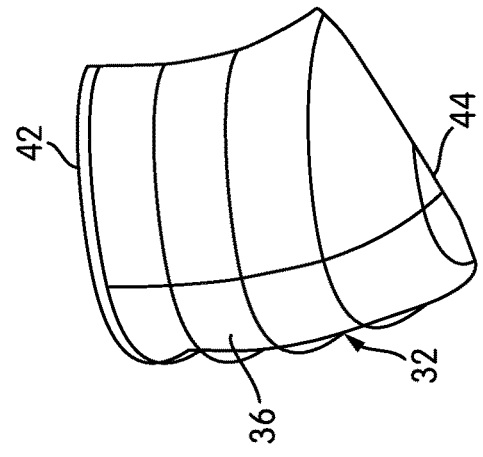
FIG. 15B is a perspective view of one of the vanes of the turbine of FIG. 15A.
Figure 15E:
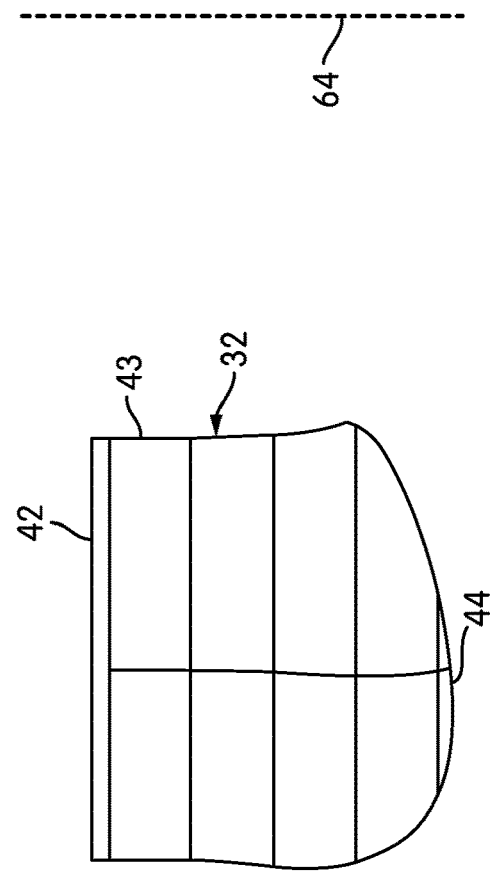
FIG. 15E is a back view of one of the vanes of the turbine of FIG. 15A.
Figure 15D:
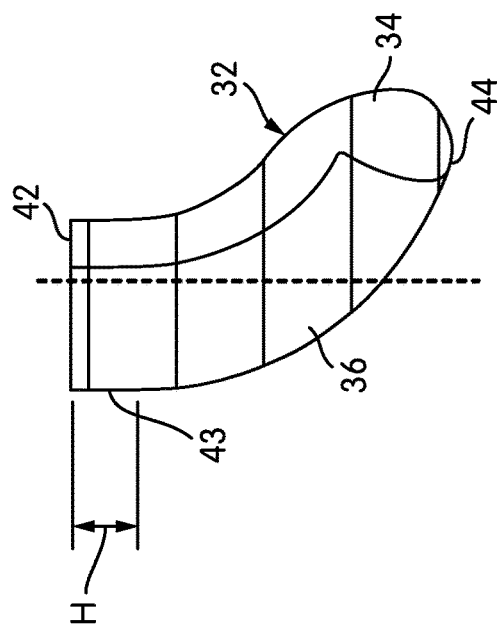
FIG. 15D is a side view of one of the vanes of the turbine of FIG. 15A.

FIG. 15A shows the jet 70 dispensing fluid 72 onto the impingement surface 34 of each of the vanes 32 of the turbine 30. The planes shown in FIG. 15A are approximately 1.5 millimeters (mm) apart for reference and according to one embodiment. The jet 70 expels the fluid 72 at a particular diameter that is equal to the diameter JD of the end of the jet 70 (through which the fluid 72 exits the jet 70). FIGS. 15B-15E show various views of one of the vanes 32 of the turbine 30. As shown, the vanes 32 have a substantially smooth and continuous curve and the impingement surface 34 is substantially ellipsoidal or spherical, aside from the vertical top portion 43 of the vanes 32 that is closest to the top end 42 of the vanes 32. As described above, this vertical top portion 43 is substantially vertical and parallel to the center rotational axis 64. The height H of this vertical top portion 43 can vary according to the desired configuration. According to one embodiment, the height H of the vertical top portion 43 is approximately 0.5* the diameter JD of the end of the jet 70, but may be approximately 2* the diameter JD of the end of the jet 70.

Vane Count

Figure 17A:
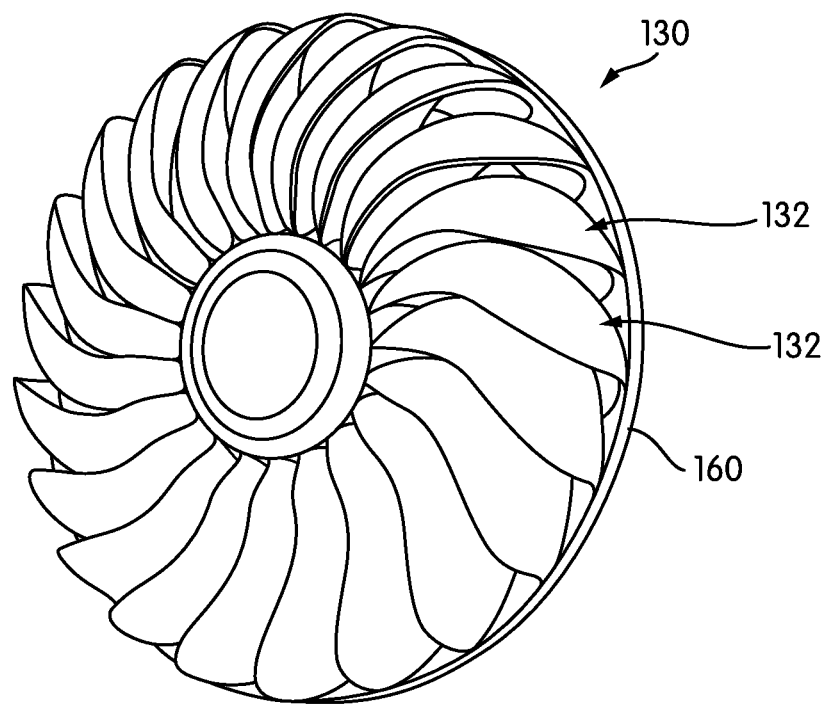
FIG. 17A is a bottom, perspective view of a conventional turbine assembly.
Figure 17B:
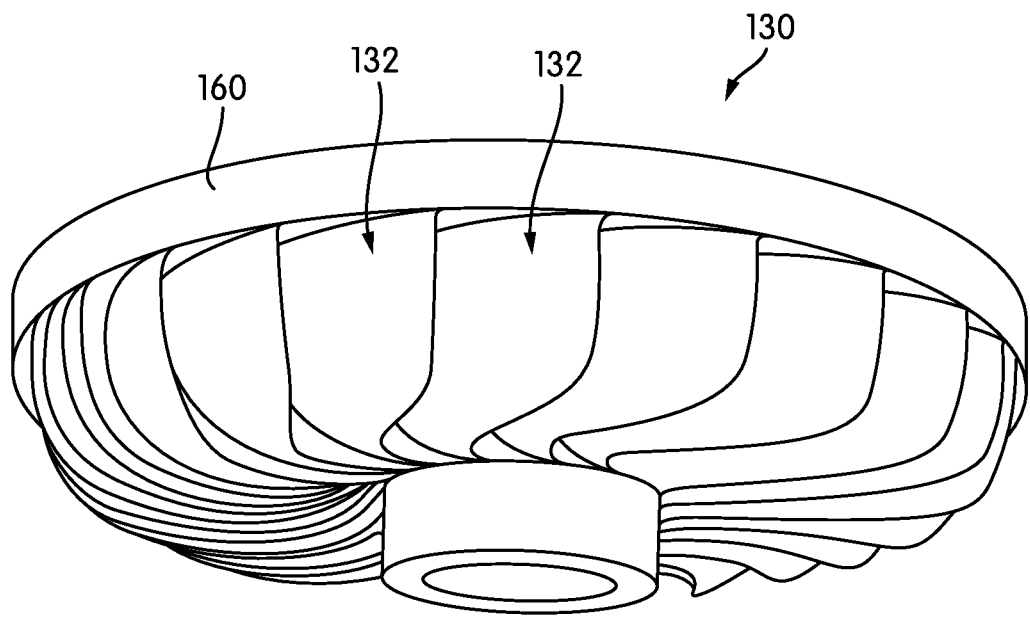
FIG. 17B is a side, perspective view of the conventional turbine assembly of FIG. 17A.

As shown in FIGS. 16A-16B, the count or number of vanes 32 of the turbine 30 is reduced (compared to conventional turbine assemblies 130) in order to create adequately-size channels 58 between each of the vanes 32, which increases the spacing between each of the vanes 32 along the circumference of the hub 59, decreases the amount that the vanes 32 are overlapped, and provides an approximately uniform clearance axial gap 57 between each of the vanes 32. For example, the turbine 30 may comprise 13-15 vanes 32 (and no more than 15 vanes 32) spaced about the hub 59, and the vanes 32 do not overlap each other. Accordingly, due to this axial gap 57 between vanes 32, the turbine 30 can be tool-steel or straight-pull molded. Comparatively, as shown in FIGS. 17A-17B, conventional turbine assemblies 130 are heavily overlapped and include 22 or more vanes 132. Conventionally, it is recommended for the vanes 132 to be heavily overlapped in order to increase the performance of the conventional turbine assembly 130 and to avoid jet-spell (i.e., fluid 172 that deflects outward immediately after the fluid 172 hits the vanes 132), which prevents some of the momentum of the fluid 172 from being captured and converted into rotation of the conventional turbine assembly 130, which reduces the hydraulic efficiency of the conventional turbine assembly 130.

As shown in FIG. 16A, the turbine 30 defines is a complete axial gap 57 between each of the vanes 32. The axial gap 57 is a portion of the channel 58 between the vanes 32 that extends vertically (or axially) unimpeded straight along the entire length of the turbine 30 (i.e., from the first axial end 52 to the second axial end 54 of the turbine 30) without being impeded or interrupted by any surfaces of the vanes 32. Due to this axial gap 57, adjacent vanes 32 are completely separated and do not overlap each other from top to bottom in a direction parallel to the center rotational axis 64. As shown in FIG. 16B, the axially-extending gap 57 extends between the back-most portion of the backside 36 of one vane 32 (e.g., along the vertical top portion 43 of the vane 32) to the front-most portion of the impingement surface 34 of an adjacent vane 32 (e.g., along the bottom end 44 of the vane 32).

The reduction in the number of vanes 32 slightly reduces the performance and the hydraulic efficiency of the turbine 30, but does allow the turbine 30 to be a single-part design, instead of a multi-part design. Additionally, in combination with the other alterations as described herein, the sensitivity of the efficiency to the vane count is substantially reduced compared to conventional turbine recommendations.

Figure 18A:
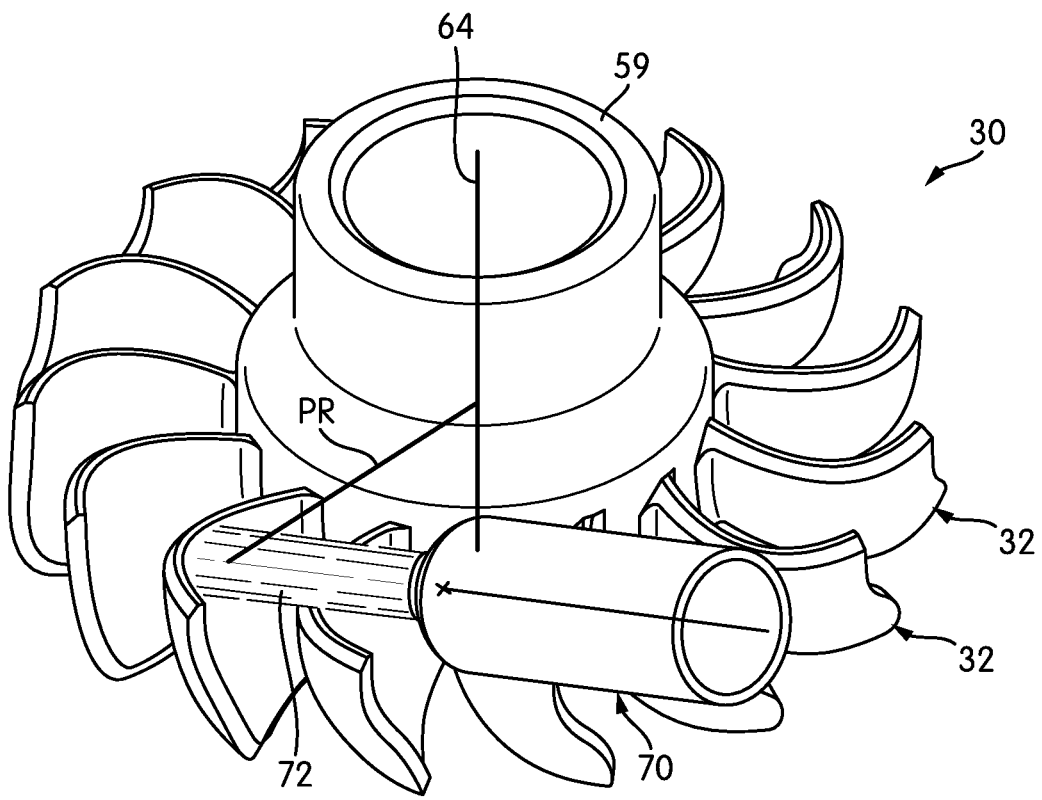
FIG. 18A is a perspective view of a turbine according to one embodiment.
Figure 18B:
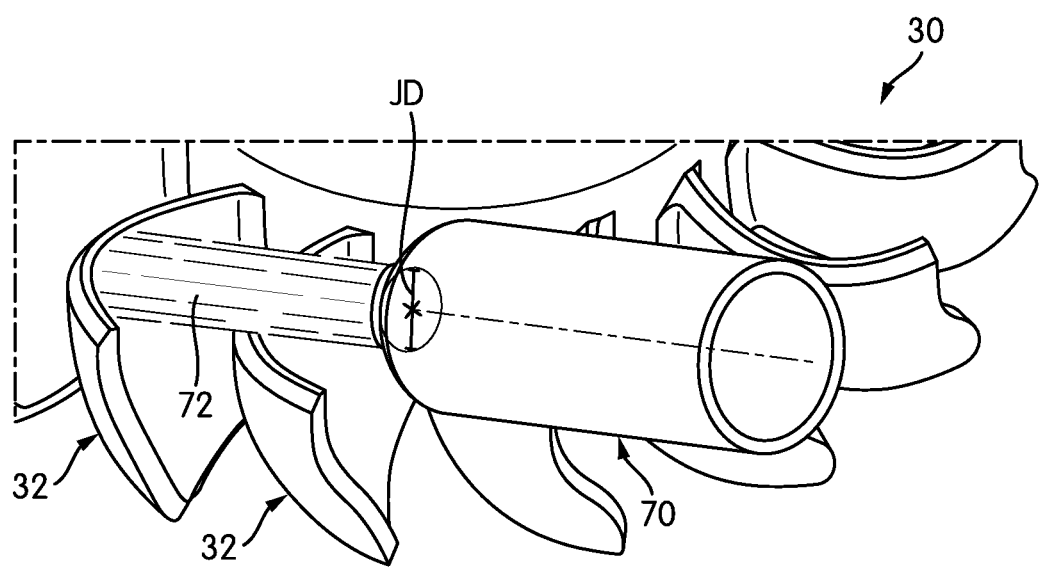
FIG. 18B is a close-up view of a portion of the turbine of FIG. 18A.

The optimal number of vanes 32 within the turbine 30 depends on a variety of different aspects of the turbine 30. For example, the optimal number of vanes 32 depends on the ratio of pitch diameter to jet diameter JD. As shown in FIG. 18A, the pitch radius PR is the distance between the central longitudinal axis of the jet 170 and the center rotational axis 64 of the turbine 30 and the pitch radius PR * 2=the pitch diameter. The jet diameter JD is the diameter at the end of the jet 70 where the fluid 72 is released, as shown in FIG. 18B. According to one embodiment, the pitch diameter is approximately 26 mm and the jet diameter JD is approximately 2.6 mm, which provides a pitch diameter to jet diameter ratio of 10:1.

Various published references differ on the exact "optimal" number of vanes. For example, in accordance with a graph from Zidonis, Audrius & Aggidis, G.A.. (2015). Pelton Turbine: Identifying the Optimum Number of Buckets Using CFD. Journal of Hydrodynamics. 28. 10.1016/S1001-6058(16)60609-1, a comparison of four different references show that, for a ratio of 10:1, a recommended number of vanes is between 16 to 25, with the average being approximately 21 vanes. However, the present turbine 30 instead comprises 13-15 vanes spaced about the hub 59 in order to create this axial gap 57.

Figure 1A:
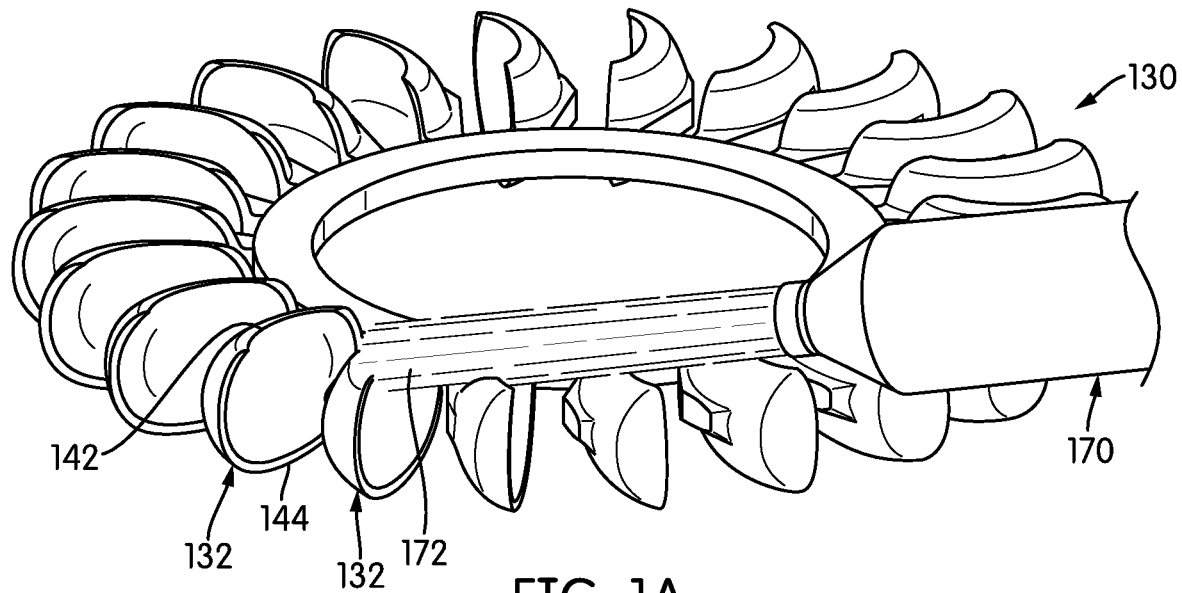
FIG. 1A is a perspective view of a conventional turbine assembly.
Figure 1B:
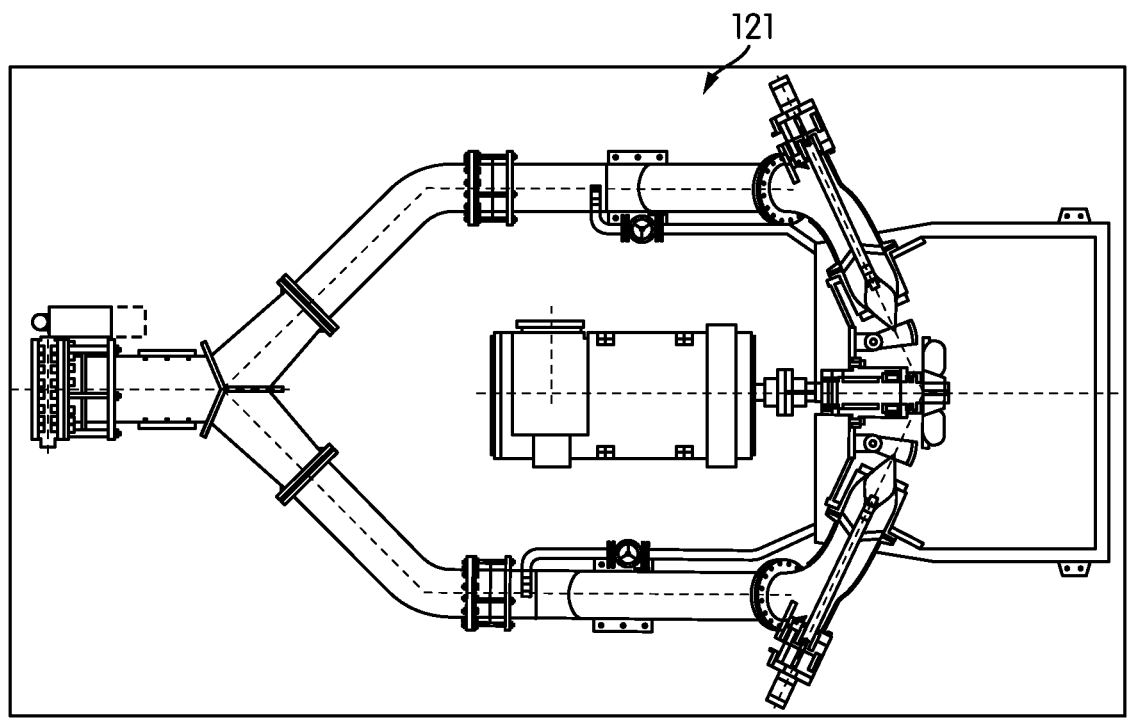
FIG. 1B is a schematic view of an assembly that includes the conventional turbine assembly of FIG. 1A.
Figure 2:
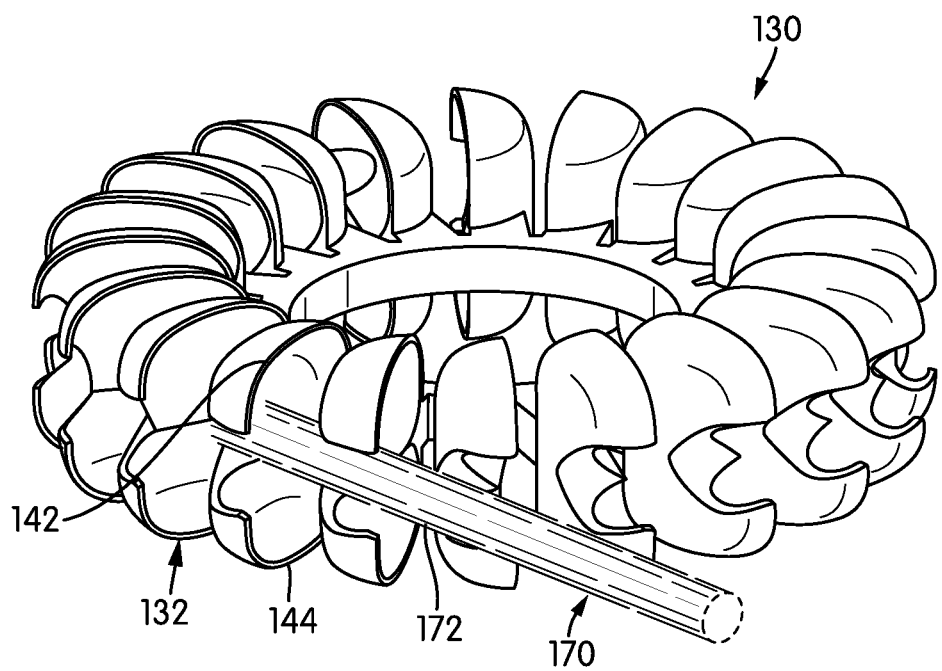
FIG. 2 is a perspective view of a conventional turbine assembly.
Figure 3:
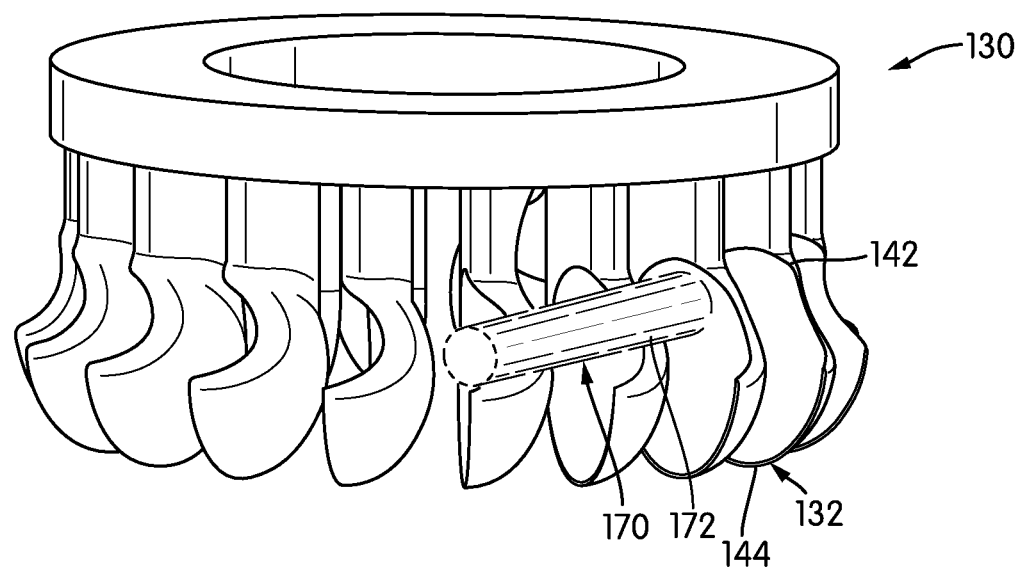
FIG. 3 is a perspective view of a conventional turbine assembly.
Figure 4:
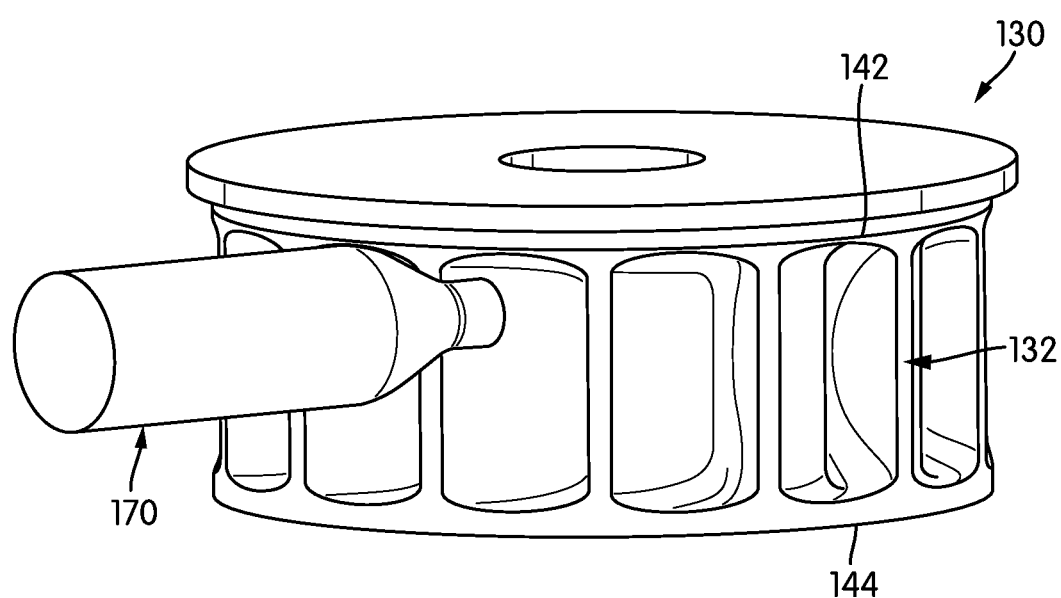
FIG. 4 is a perspective view of a conventional turbine assembly.
Figure 7:
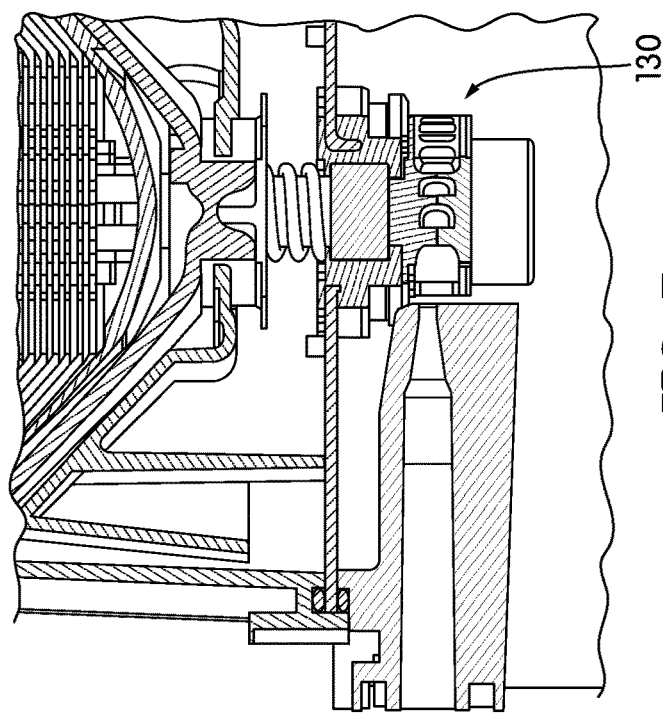
FIG. 7 is a cross-sectional view of a conventional turbine assembly.
Figure 5:
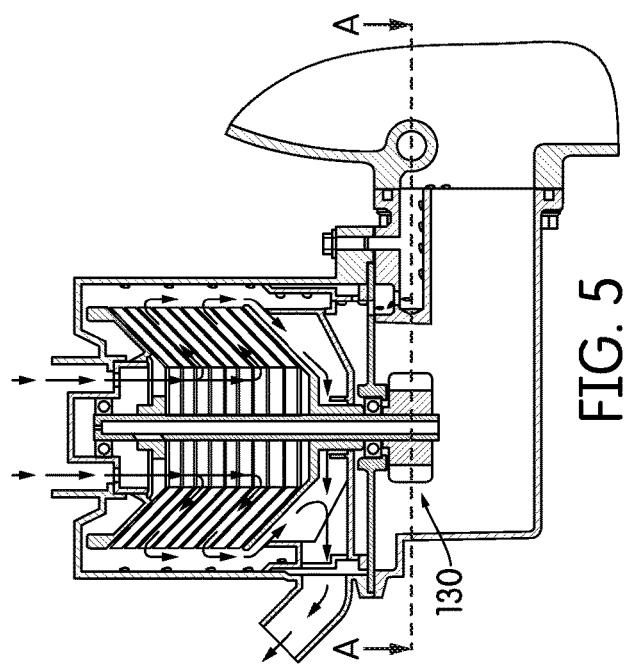
FIG. 5 is a cross-sectional view of a conventional turbine assembly.
Figure 6:
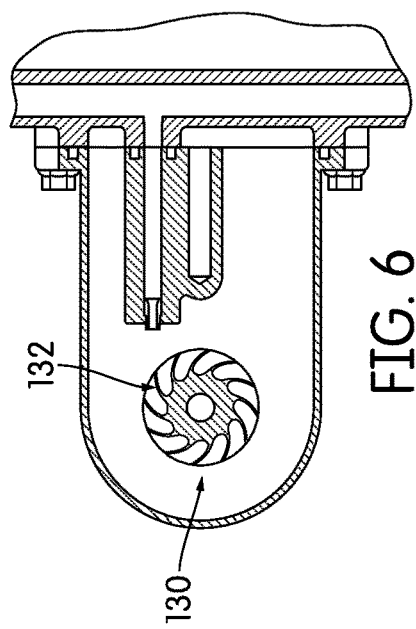
FIG. 6 is a cross-sectional view through Section A-A of FIG. 5.
Figure 19:
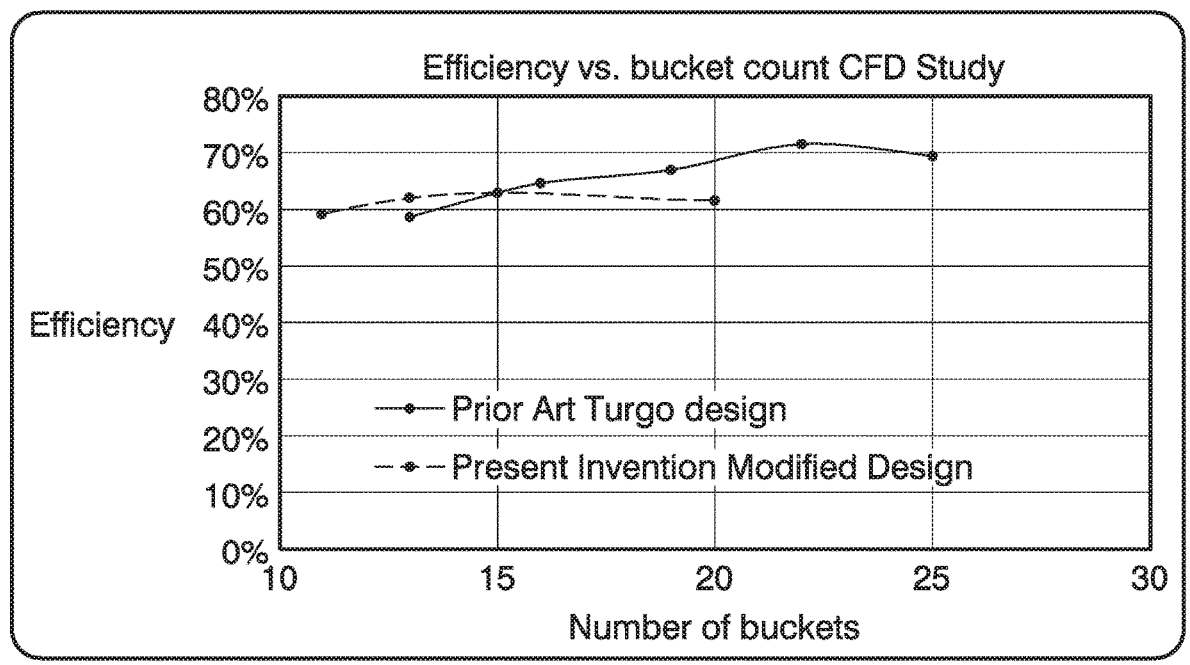
FIG. 19 is a graph showing how the number of vanes effects the efficiency of the conventional turbine assembly of FIG. 1A and the present turbine of FIG. 12A.
Figure 20A:
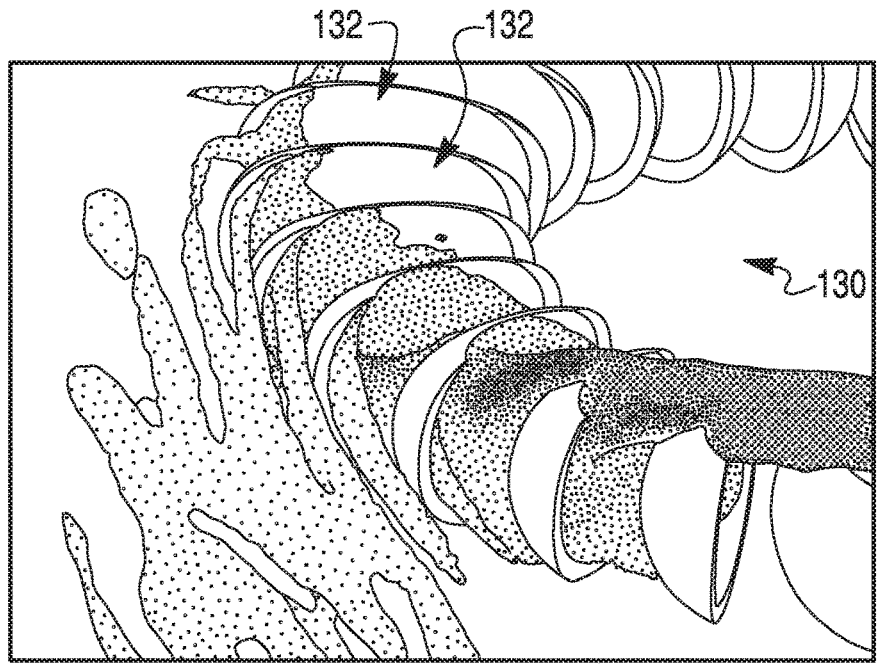
FIG. 20A is a perspective view of the conventional turbine assembly of FIG. 1A under a computational fluid dynamics (CFD) simulation.
Figure 20B:
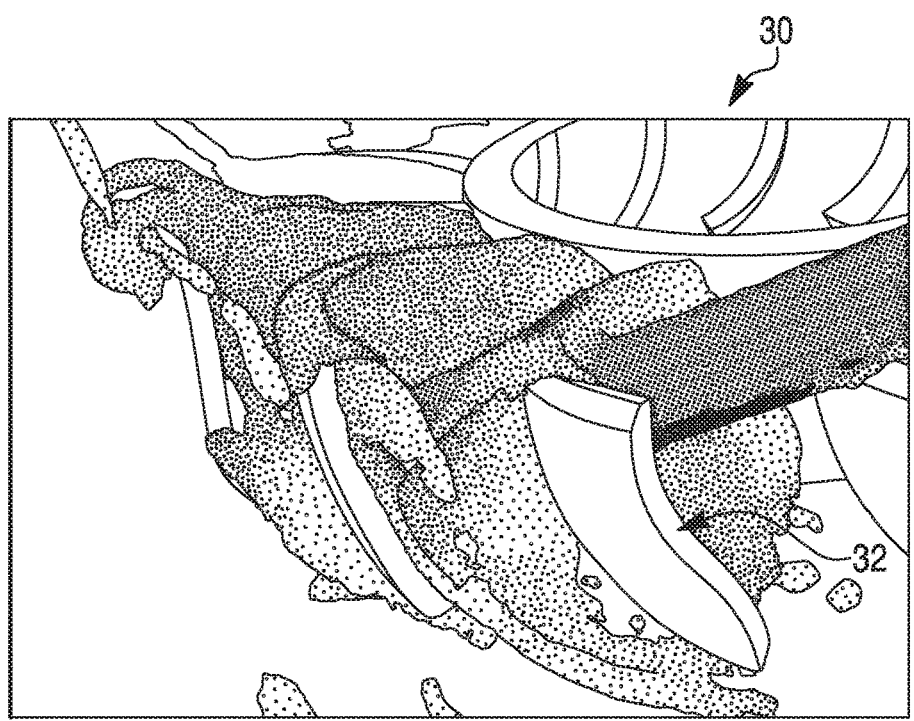
FIG. 20B is a perspective view of the turbine of FIG. 12A under a CFD simulation.

FIG. 19 shows a graph which shows the correlation between the hydraulic efficiency and the number of vanes as determined with computational fluid dynamics (CFD) simulations with a conventional Turgo-style turbine assembly 130 (as shown in FIGS. 1A and 20A) and with the turbine 30 (as shown in FIG. 20B). As shown, the peak efficiency of the conventional turbine assembly 130 is approximately 72%, while the peak efficiency of the present turbine 30 is approximately 63%. However, the efficiency loss as a result of a reduction in the number of vanes (to eliminate overlap) is different in the conventional turbine assembly 130 as compared to the present turbine 30. More specifically, the efficiency of the conventional turbine assembly 130 is more sensitive to changes in the number of vanes than the present turbine 30, as depicted in the wider range of efficiency as a function of the number of vanes for the conventional turbine assembly 130 as compared to the smaller range of efficiency for the present turbine 30 (as depicted by the "flatness" of the efficiency response in the graph of FIG. 19). Accordingly, reducing the number of vanes 32 in the present turbine 30 does not affect the efficiency of the present turbine 30 as much as the efficiency would have been affected in the conventional turbine assembly 130. Furthermore, as shown in FIG. 19, the optimal number of vanes 32 for the present turbine 30 (with all of the various features of the present turbine 30) is approximately 15 vanes, whereas the optimal number of vanes 132 for the conventional turbine assembly 130 is approximately 22 vanes.

Furthermore, the turbine 30 does not include a top plate or outer support ring 160, positioned along the first axial end 52 or the second axial end 54 (and extending along any portion of the radial length of the vanes 32) that is commonly used within conventional turbine assemblies 130, as shown in FIGS. 17A-17B. This outer ring 160 is typically used to support, stiffen, and strengthen the vanes 132 of the conventional turbine assembly 130, in particular in heavy hydropower applications. However, the outer ring 160 creates an undercut feature within the conventional turbine assembly 130. By eliminating the outer ring 160 within the present turbine 30, the turbine 30 can be molded as a single part and the efficiency of the turbine 30 improves by approximately 1%.

Increased Angle of the Jet

As a result of the first axial end 52 of the turbine 30 not including any undercut features, the fluid 72 incoming from the jet 70 is deflected vertically or axially upward, which causes the fluid 72 to immediately spill out of the top of the vane 32. Conversely, in various conventional turbine assemblies 130, the fluid 172 is scooped or directed downwardly along the vane 132 in the desired direction and thus discharged toward or at the bottom of the vane 132 as a result of the undercut feature at the first axial end 152 of the conventional turbine assembly 130. Desired downward discharge with minimal residual velocity is affected by the exit angle of the vane and an optimal relative speed of 0.4 to 0.5 between the vane and the jet.

Figure 21:
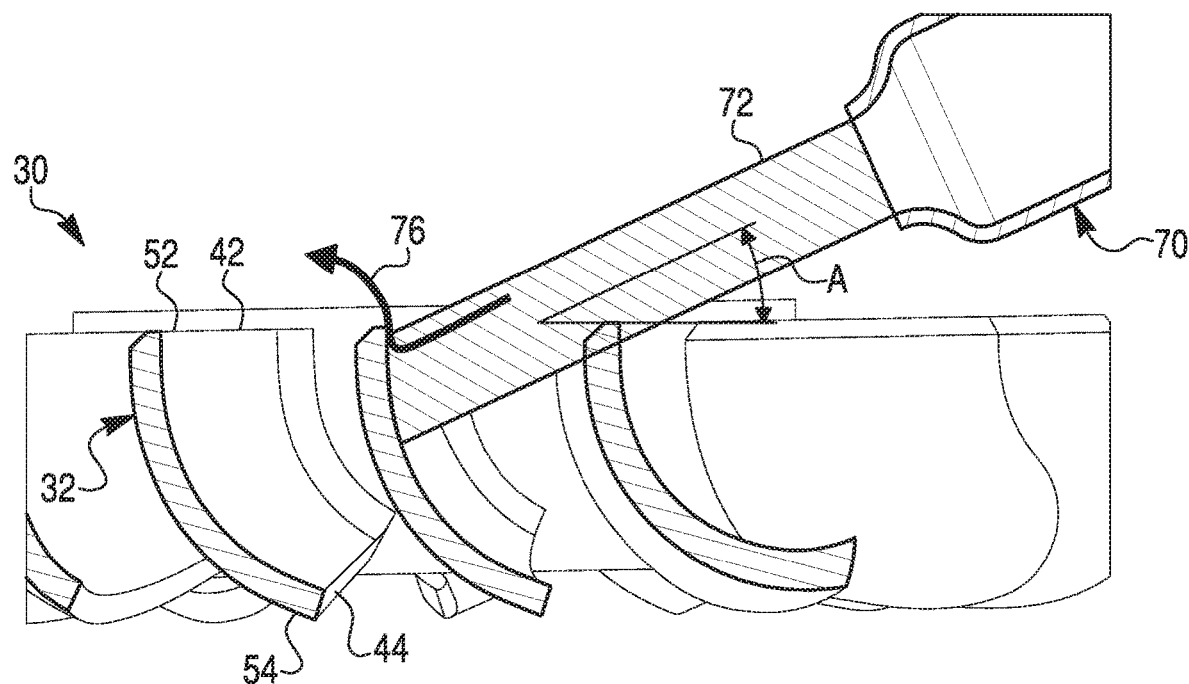
FIG. 21 is a cross-sectional view of the turbine of FIG. 12A.
Figure 22:
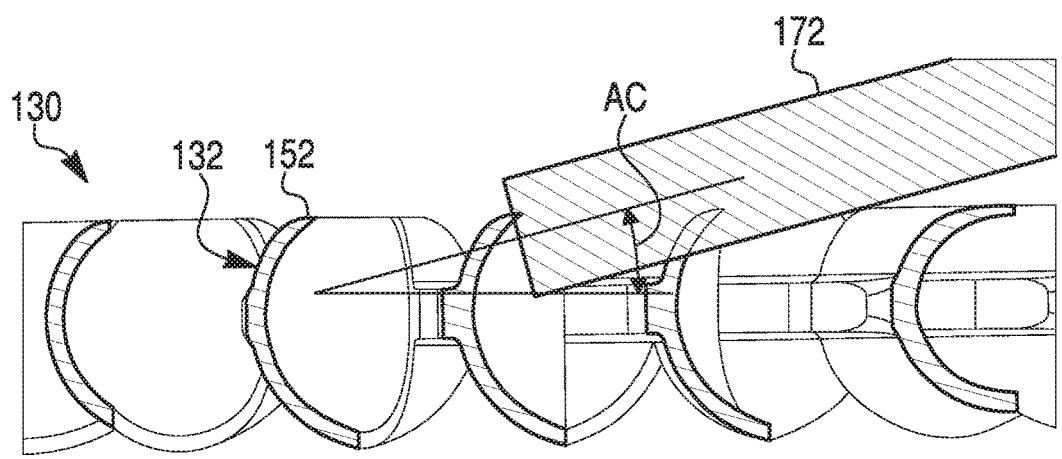
FIG. 22 is a cross-sectional view of the conventional turbine assembly of FIG. 1A.
Figure 23:
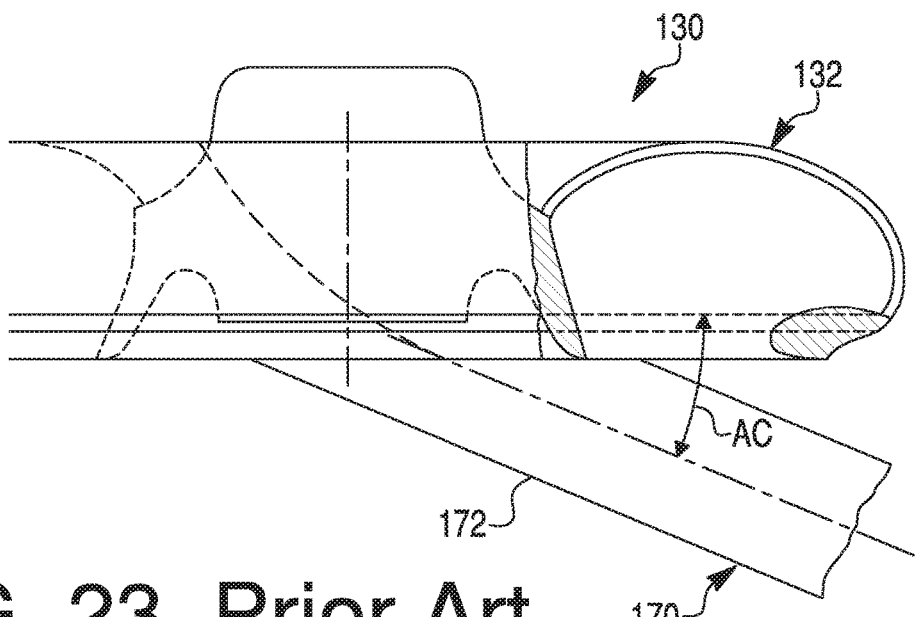
FIG. 23 is a portion of the conventional turbine assembly of FIG. 8.

In order to direct fluid 72 into the vanes 32, the jet 70 is oriented at a downward angle A toward the first axial end 52 of the turbine 30 (and thus the top end 42 of each of the vanes 32). In conventional turbine assemblies 130 (as shown in FIGS. 22-23), the angle AC of the jet 170 is relatively small in order to maximize the amount of impulse energy that is delivered to the vanes 32. However, in the present turbine 30, in order to reduce the amount of undesired vertical (reverse) discharge, splash-out, or spill-out 76 of the fluid 72 as a result of the configuration of the first axial end 52 of the turbine 30 (i.e., no undercut features and the vertical top portion 43 of the vanes 32 is parallel to the center rotational axis 64), the angle A of the jet 70 relative to a horizontal radial-tangential plane of the turbine 30 (where the horizontal radial-tangential plane is perpendicular to the vertical (i.e., axial) center rotational axis 64) is increased and the jet 70 is oriented at a steeper angle relative to the vanes 32 than recommended for conventional turbine assemblies 130, as shown in FIGS. 21-23. For example, typically, the angle AC of the jet 170 in conventional turbine assemblies 130 is approximately 10-20° (or, according to some conventional turbine assemblies 130, 15-20°, whereas the angle A of the jet 70 in the present turbine 30 is approximately 20-30°. According to one embodiment, the jet 70 is positioned at an angle A of approximately 22-26° or, more preferably, 23-25°. This increase in angle A of the jet 70 partially decreases the tangential jet velocity (as a result in the decrease in available impulse energy). However, the net impulse energy is recovered due to the decrease in vertical spill-out of the fluid 72. Accordingly, with the increased angle A of the jet 70, more of the fluid 72 is captured within the turbine 30 (compared to a smaller angle A) and the predicted peak efficiency of the turbine 30 is still 63%.

Figure 24:
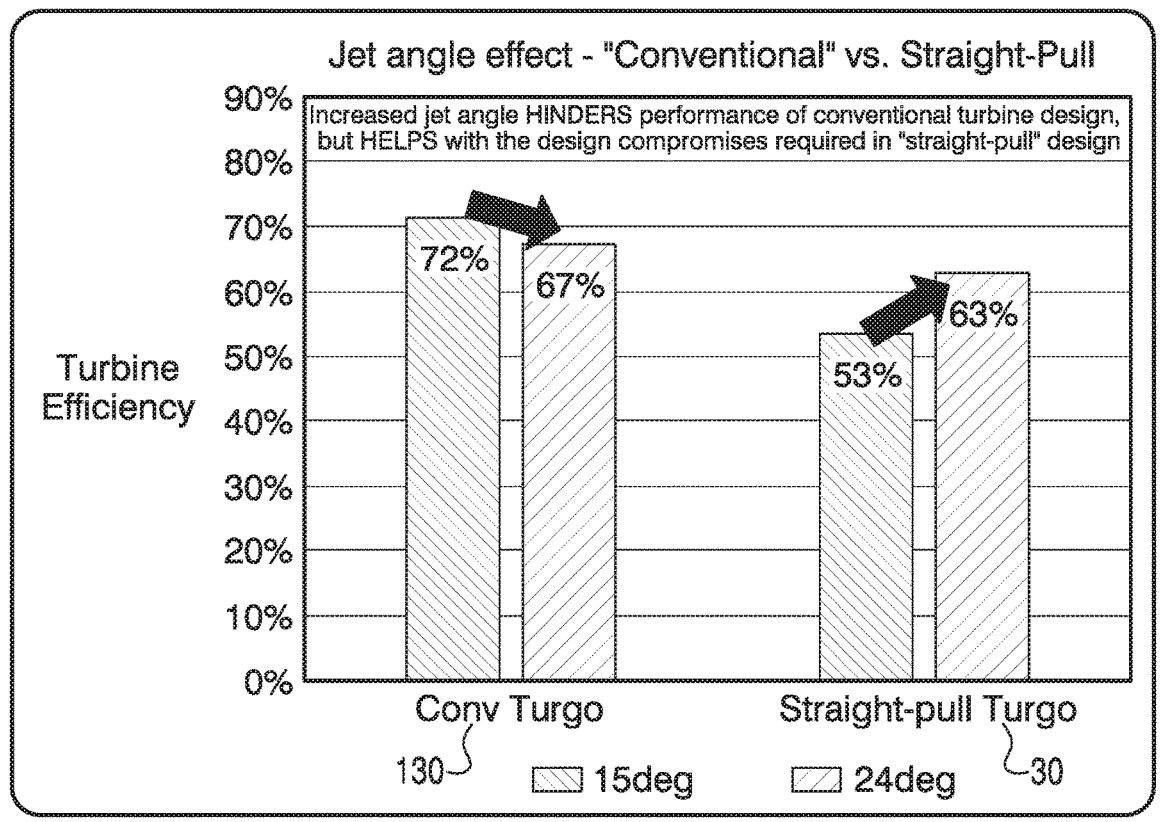
FIG. 24 is a graph of the effect of the angle of the jet on the efficiency of a conventional turbine assembly and the present turbine of FIG. 12A.

FIG. 24 shows how the turbine efficiency of a conventional turbine assembly 130 (that includes an undercut feature along the first axial end 152 to receive and capture the fluid 172 and has 22 vanes 132) and the present turbine 30 (that does not have any undercut features along the first axial end 52 of the turbine 30 and has 15 vanes 32) is affected by an increase in the angle of the jet according to CFD simulations. As shown, in a number of conventional turbine assemblies 130, if the angle AC of the jet 170 is increased (from 15° to 24°), the efficiency of the conventional turbine assemblies 130 is decreased (as expected)

since less momentum from the fluid 172 can be transferred to the vanes 132 as the angle AC increases. Accordingly, an increased angle AC of the jet 170 hinders the performance of the conventional turbine assembly 130. Conversely, in the present turbine 30, if the angle A of the jet 70 is increased (from 15° to 24°), the efficiency of the turbine 30 is unexpectedly increased, despite the decrease in momentum from the fluid 72 that is transferred to the vanes 32. Accordingly, an increased angle A of the jet 70 actually helps the performance of the turbine 30 as a result of the other design modifications within the turbine 30.

Chamfered Top End and Backside of the Vane

Figure 25A:
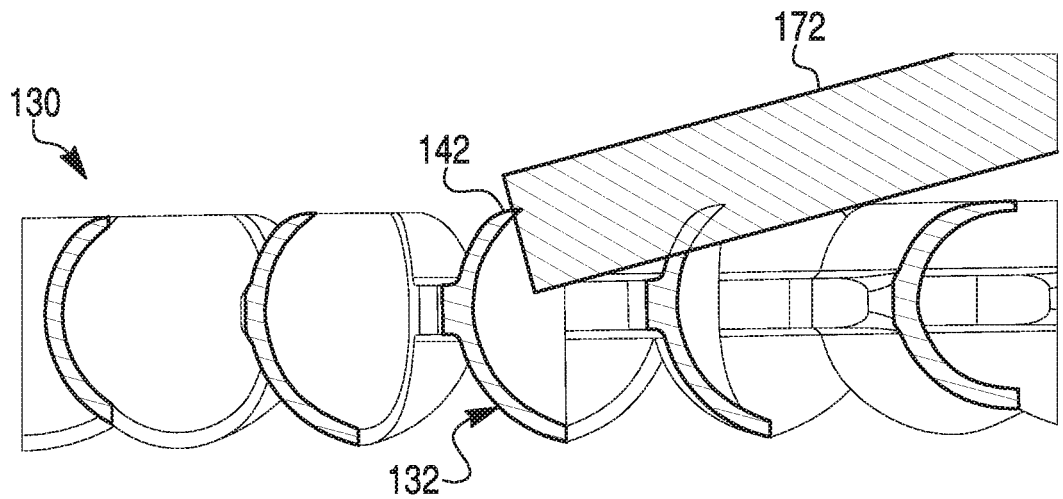
FIG. 25A is a cross-sectional view of the conventional turbine assembly of FIG. 1A.
Figure 25B:
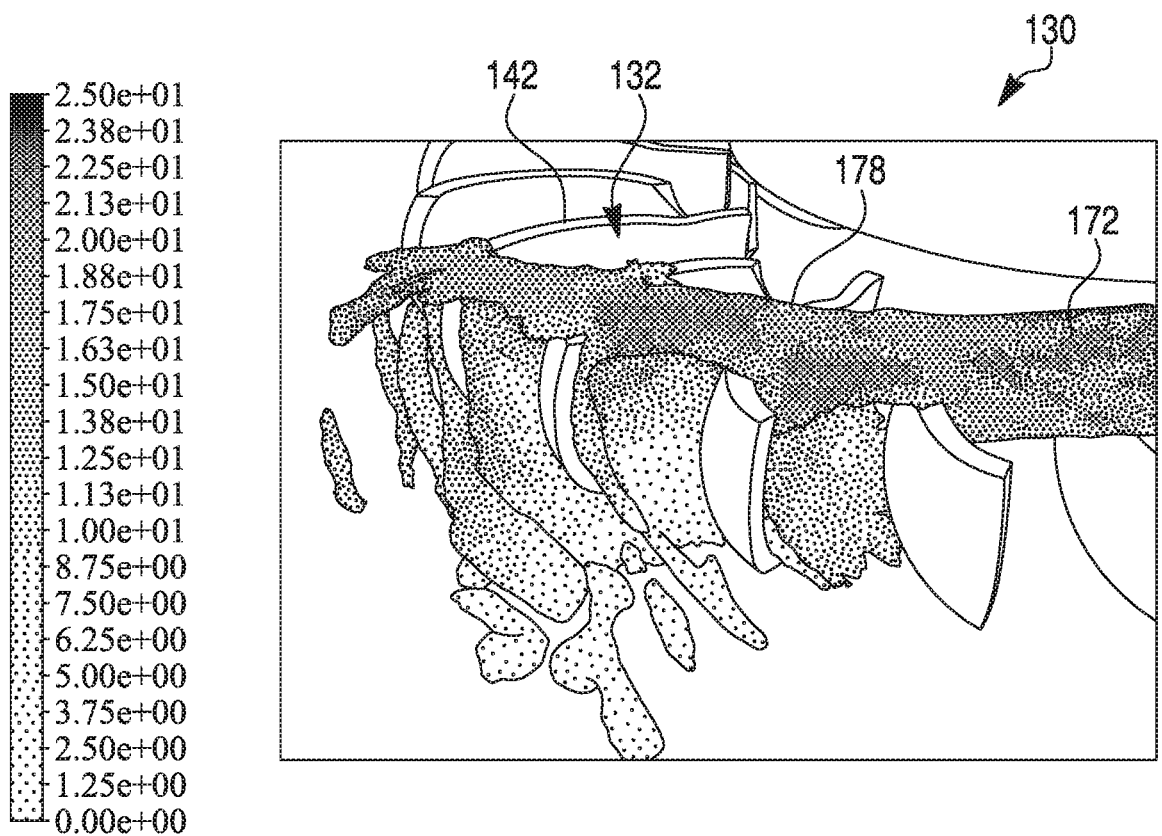
FIG. 25B is a perspective view of the conventional turbine assembly of FIG. 1A under a CFD simulation.

A number of conventional turbine assemblies 130 typically have a "sharp edge" to cleanly cut through the fluid 172 from the jet 170. However, with the molded or cast single-part design of the present turbine 30, creating a sharp or thin edge along the top end of the vane 32 is difficult since sharp edges are difficult to fill in the molding or casting process. Furthermore, in some conventional turbine assemblies 130, the top end 142 of the vane 132 has a flat top, as shown in FIGS. 25A-25B. However, as shown the CFD simulation in FIG. 25, the flat top on the top end 142 of the vane 132 of the conventional turbine assembly 130 creates a problem in that the flat top causes the fluid 172 to horizontally deflect (as shown at 178) across the top of the conventional turbine assembly 130.

Figure 26:
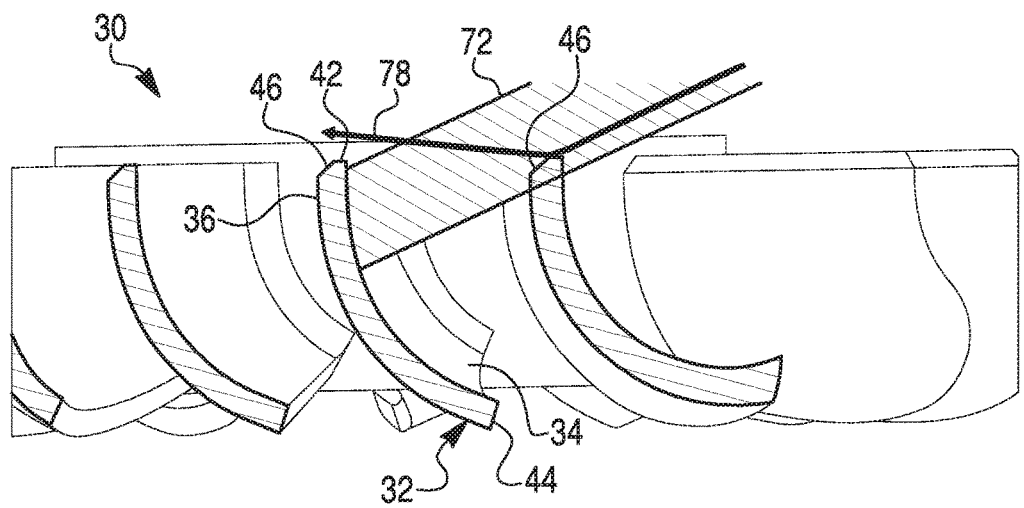
FIG. 26 is a cross-sectional view of the turbine of FIG. 12A.
Figure 27:
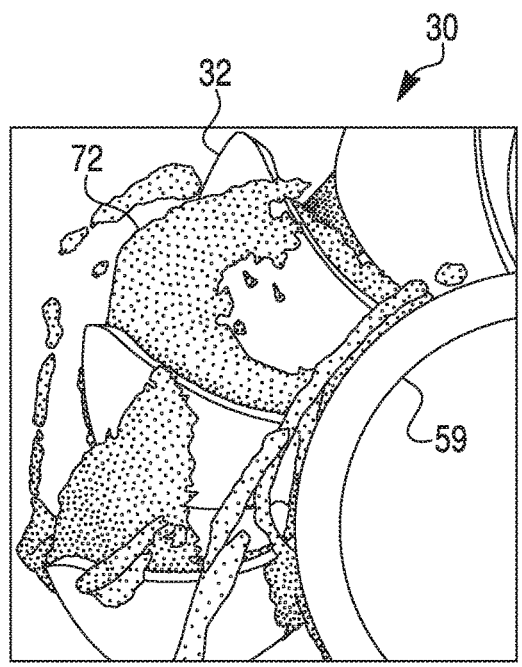
FIG. 27 is a bottom view of the turbine of FIG. 12A under a CFD simulation.
Figure 28:
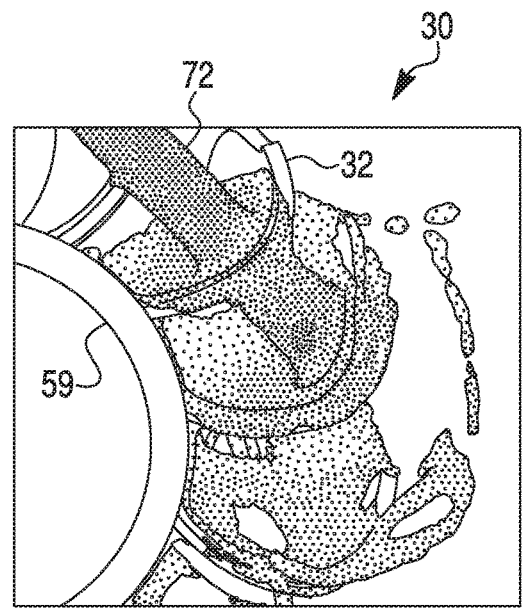
FIG. 28 is a top view of the turbine of FIG. 12A under a CFD simulation.
Figure 29:
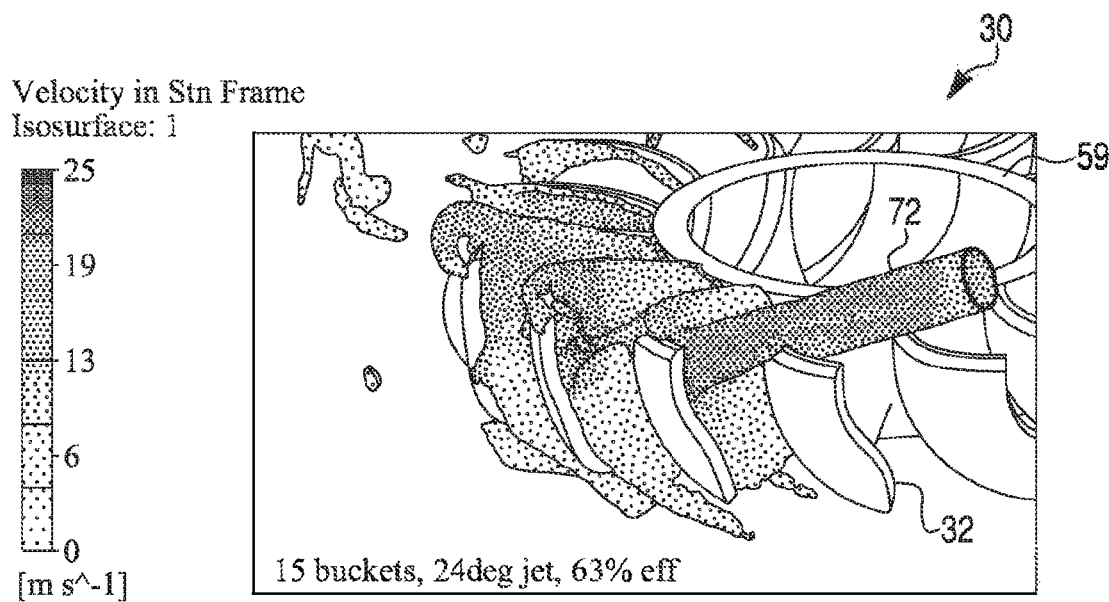
FIG. 29 is a top, perspective view of the turbine of FIG. 12A under a CFD simulation.
Figure 30:
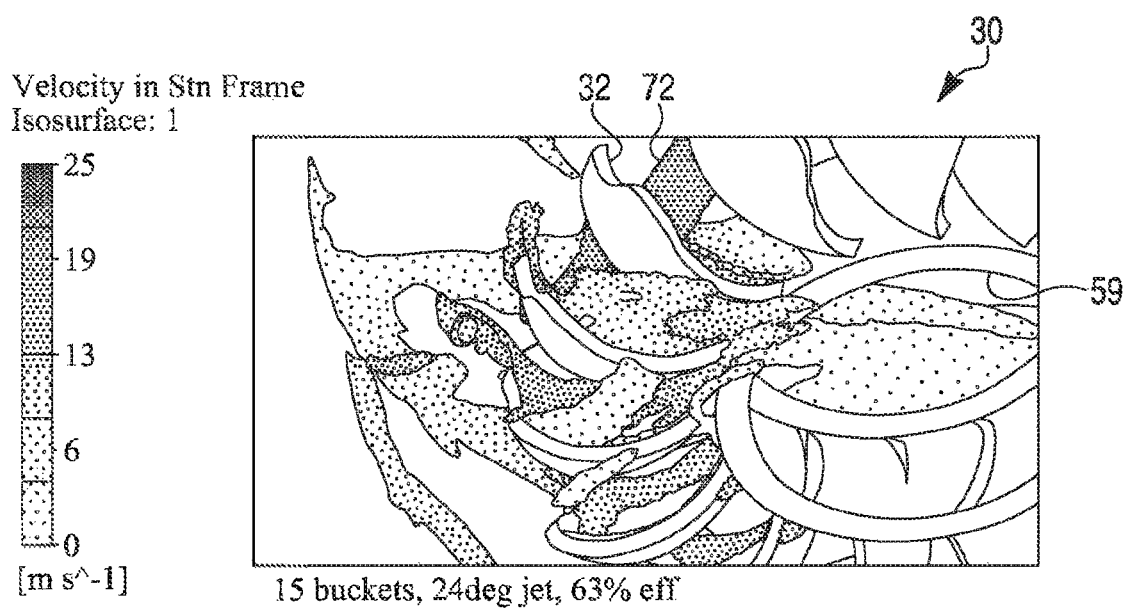
FIG. 30 is a bottom, perspective view of the turbine of FIG. 12A under a CFD simulation.
Figure 31:
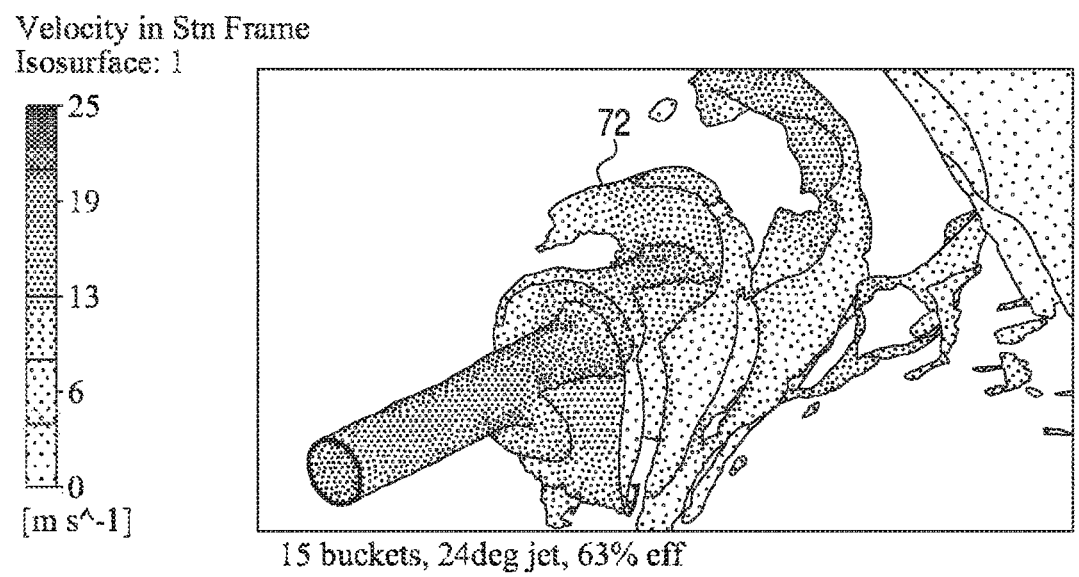
FIG. 31 is a perspective view of the turbine of FIG. 12A under a CFD simulation with the structure of the turbine hidden.

Accordingly, in order to minimize the horizontal deflection 78 of the fluid 72 at the entrance into the turbine 30 as a result of the fluid 72 hitting the top end 42 of each of the vanes 32), each of the vanes 32 comprises a beveled edge or chamfer 46 between and along the backside 36 and the top end 42 of each of the vanes 32 (i.e., the back top corner of each of the vanes 32 is chamfered), as shown in FIG. 26. With this chamfer 46, the turbine 30 is still moldable as a single part. The chamfer 46 may be a surface that is angled relative to and extends substantially linearly between the backside 36 and the top end 42.

The size of the chamfer 46 may vary according to the desired configuration. For example, the size of the chamfer 46 may be 20-80% of the thickness of the vane 32. More preferably, the size of the chamfer 46 may be greater than 50% of the thickness of the vane 32.

Alternatively, the top end 42 of each of the vanes 32 has a fillet radius in which the corner of the top end 42 along the backside 36 of the vanes 32 is curved, arced, or rounded. In each of above embodiments, the corner of the top end 42 along the impingement surface 34 may still be relatively "sharp" (i.e., at a 90° angle). In particular, the top end 42 may be approximately perpendicular to and directly abutting and extending along the top portion of the impingement surface 34. Although the top end 42 may also be approximately perpendicular to the top portion of the backside 36, the chamfer 46 is positioned in between and extends at an angle between the top end 42 and the backside 36. The top end 42 may extend linearly between the impingement surface 34 and the chamfer 46.

Turbine Efficiency

Due to various features of the present turbine 30, the efficiency of the turbine 30 is compromised, but the design of the turbine 30 (compared to conventional turbine assemblies 130) is simplified and therefore less expensive. For example, in CFD "virtual testing," the turbine 30 achieved reasonably high efficiency (a predicted 63% efficiency) despite the design compromises required for a single-piece design, which is higher than some conventional two-part designs. Conventional turbine assemblies 130 (with multiple parts) typically have approximately a 72% efficiency at a similar scale and with a similar fluid and pressure.

According to many CFD simulations (some of which are shown in FIGS. 27-31), the particular configuration of the turbine 30 provides the best performance while still being moldable as a single-piece. In particular, the velocity contours plotted on the liquid phrase boundary surface provide visual feedback regarding the performance of the turbine 30. FIGS. 27-31 show how the fluid 72 flows with respect to the turbine 30. As further shown in FIGS. 27-31, the amount of residual vertical spill out 76 is minimized.

Additionally, efficiency of impulse turbines at a small size scale and a high liquid viscosity condition (e.g., oil) for lube-oil-driven products (e.g., crankcase blowby oil separators or lube-oil centrifuges) is substantially lower than efficiency of impulse turbines at a large size scale and that use water in hydroelectric power applications. The impulse turbine 30 and the conventional impulse turbine assembly 130 are relatively small and the fluid 72, 172 used with the turbine 30 and the conventional turbine assembly 130, respectively, has a relatively high liquid viscosity. Comparatively, hydroelectric turbines, such as "picohydro" turbines, are usually many times larger in size than the turbine 30 and the conventional turbine assembly 130. Furthermore, hydroelectric turbines use water instead of oil to drive the turbine. The viscosity of water is less than 1/10th the viscosity of the fluid 72, 172 (e.g., engine oil) that is used with the turbine 30 and the conventional turbine assembly 130, respectively. For example, the viscosity of water is approximately 1 cP and the viscosity of the fluid 72, 172 (e.g., the oil) may be approximately 10-20 cP. Accordingly, the efficiency of the turbine 30 and the efficiency of the conventional turbine assembly 130 are substantially lower than the efficiency of larger scale turbines used with water in hydroelectric power applications.

The "scale effect" can be characterized by the Reynolds number of the turbines by the below equation:

$$Re = \frac{\rho v D}{\mu}$$

where Re is the Reynolds number, rho ($\rho$) is the density of the fluid, v is the mean velocity of the fluid, D is the diameter, and $\mu$ is the viscosity of the fluid.

The Reynolds number, and therefore the efficiency, of the turbine 30 and of the conventional turbine assembly 130 is relatively constrained relative to the Reynolds number of hydroelectric turbines due to a number of different factors, in particular how viscous, wetting, and "sticky" the fluid 72, 172 is. For example, the Reynolds number of the turbine 30 and of the conventional turbine assembly 130 is typically at least two to three orders of magnitude smaller than the Reynolds number of hydroelectric turbines. Therefore, the turbine 30 and conventional turbine assemblies 130 are less efficient than hydroelectric turbines. Typically, the hydraulic efficiency of hydroelectric turbines (even small hydroelectric turbines) ranges between approximately 70-90%. The efficiency of conventional turbine assemblies 130 (as determined by CFD volume of fluid (VOF) modeling) ranges between approximately 30-70%, depending on design details and care taken to avoid jet-bucket interference, jet spill, and other design-related problems.

As utilized herein, the terms "about," "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A separation assembly comprising:
   a housing;
   a jet that expels a fluid within the housing; and
   a turbine positioned within the housing and positioned so as to be contacted by the fluid expelled from the jet, the fluid causing the turbine to rotate about a center rotational axis within the housing,
   the turbine comprising a first axial end, a second axial end, and a plurality of vanes extending axially relative to the center rotational axis from the first axial end to the second axial end, the plurality of vanes defining axially-extending channels between each of the plurality of vanes, the first axial end being axially open such that fluid can flow unblocked axially through the first axial end and into the axially-extending channels,
   wherein the jet is positioned such that at least a portion of the fluid enters into the turbine through the first axial end,
   each of the plurality of vanes extends axially between a top end and a bottom end, the top end closer to the first axial end of the turbine than the bottom end, wherein each of the plurality of vanes comprise an impingement surface on a first side thereof and a backside on a second side thereof, wherein the fluid from the jet is directed to the impingement surface, the portion of the impingement surface at the top end of each of the plurality of vanes is further forward than the rest of the impingement surface in a rotational direction of the turbine, and
   the turbine defines an axial gap between each of the plurality of vanes and within the axially-extending channel that extends axially unimpeded straight from the first axial end to the second axial end of the turbine.

2. The separation assembly of claim 1, wherein the turbine is formed as a single piece.

3. The separation assembly of claim 1, wherein each of the plurality of vanes comprises a vertical top portion that extends parallel to the center rotational axis.

4. The separation assembly of claim 1, wherein adjacent vanes of the plurality of vanes do not overlap each other in an axial direction that is parallel to the center rotational axis.

5. The separation assembly of claim 1, wherein neither the first axial end nor the second axial end of the turbine are closed off such that fluid can flow unblocked axially between and through the first axial end and the second axial end.

6. The separation assembly of claim 1, wherein the turbine does not comprise a plate or ring that extends along any portion of the radial length of the plurality of vanes.

7. The separation assembly of claim 1, wherein the jet is positioned at an angle relative to a horizontal radial-tangential plane of the turbine, and wherein the horizontal radial-tangential plane of the turbine is perpendicular to the center rotational axis.

8. The separation assembly of claim 7, wherein the angle of the jet is 22° to 26° relative to the horizontal radial-tangential plane of the turbine.

9. The separation assembly of any one of claim 1, wherein the jet is angled downward toward the first axial end of the turbine.

10. The separation assembly of any claim 1, wherein each of the plurality of vanes comprises a chamfer between the backside and the top end of each of the plurality of vanes.

11. The separation assembly of claim 10, wherein the top end is substantially perpendicular to respective top portions of the impingement surface and the backside.

12. The separation assembly of claim 10, wherein the chamfer is angled relative to and extends substantially linearly between the top end and the backside.

13. The separation assembly of claim 1, wherein the turbine comprises 13 to 15 vanes that are spaced about a hub of the turbine.

14. The separation assembly of claim 1, wherein the top end of each of the plurality of vanes is further forward in the rotational direction of the turbine than the bottom end of each of the plurality of vanes at the same radial distance from the center rotational axis.

15. The separation assembly of claim 1, wherein each of the plurality of vanes curve relative to an axial direction between the top end and the bottom end of each of the plurality of vanes, wherein the axial direction is parallel to the center rotational axis.

16. The separation assembly of any one of claim 1, wherein each of the plurality of vanes curve relative to a radial direction between an inner radial edge and an outer radial edge.

17. A turbine for use in a separation assembly, the turbine sized for positioning within housing of the separation assembly and positionable so as to be contacted by fluid expelled from a jet of the separation assembly, thereby causing the turbine to rotate about a center rotational axis within the housing, the turbine comprising:
- a first axial end,
- a second axial end, and
- a plurality of vanes extending axially relative to the center rotational axis from the first axial end to the second axial end, the plurality of vanes defining axially-extending channels between each of the plurality of vanes, the first axial end being axially open such that fluid can flow unblocked axially through the first axial end and into the axially-extending channels,
- each of the plurality of vanes extends axially between a top end and a bottom end, the top end closer to the first axial end of the turbine than the bottom end, wherein each of the plurality of vanes comprise an impingement surface on a first side thereof and a backside on a second side thereof, wherein the fluid from the jet is directed to the impingement surface, the portion of the impingement surface at the top end of each of the plurality of vanes is further forward than the rest of the impingement surface in a rotational direction of the turbine, and
- the turbine defines an axial gap between each of the plurality of vanes and within the axially-extending channel that extends axially unimpeded straight from the first axial end to the second axial end of the turbine.

18. The turbine of claim 17, wherein the turbine is formed as a single piece.

19. The turbine of claim 17, wherein adjacent vanes of the plurality of vanes do not overlap each other in an axial direction that is parallel to the center rotational axis.

\* \* \* \* \*